United States Patent [19]
Kleinerman et al.

[11] Patent Number: 5,228,137
[45] Date of Patent: Jul. 13, 1993

[54] METHOD FOR CONTROLLING EXECUTION OF HOST COMPUTER APPLICATION PROGRAMS THROUGH A SECOND COMPUTER BY ESTABLISHING RELEVANT PARAMETERS HAVING VARIABLE TIME OF OCCURRENCE AND CONTEXT

[75] Inventors: Aurel Kleinerman, Menlo Park; David J. Carroll, Cupertino, both of Calif.

[73] Assignee: Mitem Corporation, San Jose, Calif.

[21] Appl. No.: 549,889

[22] Filed: Jul. 9, 1990

Related U.S. Application Data

[63] Continuation-in-part of Ser. No. 145,692, Jan. 15, 1988, abandoned, which is a continuation of Ser. No. 792,424, Oct. 29, 1985, abandoned.

[51] Int. Cl.⁵ .................... G06F 15/00; G06F 13/00
[52] U.S. Cl. ...................... 395/500; 395/800; 364/228; 364/228.5; 364/230.6; 364/DIG. 1
[58] Field of Search ............... 395/500, 575, 161, 135, 395/800; 340/721

[56] References Cited

U.S. PATENT DOCUMENTS

| | | | |
|---|---|---|---|
| 4,183,086 | 1/1980 | Kober | 395/425 |
| 4,301,513 | 11/1981 | Haag et al. | 395/500 |
| 4,455,624 | 6/1984 | Haag et al. | 395/161 |
| 4,503,516 | 5/1985 | Agnew et al. | 395/500 |
| 4,513,373 | 4/1985 | Sheets | 395/500 |
| 4,559,614 | 12/1985 | Peek et al. | 395/500 |
| 4,646,261 | 2/1987 | Ng | 395/164 |
| 4,806,919 | 2/1989 | Nakayama et al. | 340/721 |
| 4,839,828 | 6/1989 | Elsner et al. | 395/135 |
| 4,862,389 | 8/1989 | Takagi | 340/721 |
| 5,036,484 | 7/1991 | McCoy et al. | 395/500 |

Primary Examiner—Thomas C. Lee
Assistant Examiner—Meng-Ai T. An
Attorney, Agent, or Firm—Skjerven, Morrill, MacPherson, Franklin & Friel

[57] ABSTRACT

A method of simultaneously executing one or more computer application programs in one or more host computer system under the control of a second computer system, where the second computer system performs operations on data and instructions and the host computer systems generates presentation information based on the application programs, involves establishing selected parameters in the host computer presentation information, interpreting selected portions of the host computer system's presentation information, providing the interpreted selected portions of the host computer system's presentation information as input to a computer program resident in the second computer system, examining the host computer system presentation information at the second computer system to detect the presence therein of one or more the selected parameters, continuing operation of the second computer system during the examining for the selected parameters, and generating an indication to the second computer system of the detection of one or more of the selected parameters in the host computer system presentation information.

16 Claims, 16 Drawing Sheets

METHOD FOR CONTROLLING EXECUTION OF HOST COMPUTER APPLICATION PROGRAMS THROUGH A SECOND COMPUTER BY ESTABLISHING RELEVANT PARAMETERS HAVING VARIABLE TIME OF OCCURRENCE AND CONTEXT

CROSS REFERENCE TO RELATED APPLICATIONS

This application is a continuation-in-part of application Ser. No. 07/145,692, filed Jan. 15, 1988, now abandoned which in turn is a continuation of application Ser. No. 06/792,424, filed Oct. 29, 1985, now abandoned.

BACKGROUND

1. Field of the Invention

This invention relates to the execution of computer programs, and relates more particularly to the execution of one or more computer application programs on one or more host computers under the control of a second computer.

2. Prior Art

There is a need in the data processing field for a single product configuration capable of addressing the following requirements in the computer industry:

1. The ability to develop and operate "user friendly" interfaces which, by providing added functional capability such as integration of data, result in computer systems which have a high degree of consistency and ease of operation through the use of techniques such as high function representations in the form of graphic icons and other graphics, and which are relatively easy for a user to learn, preferably in an intuitive way.

2. The ability for new computer systems to operate existing software packages, without modifications to those packages, and to retain the benefits currently found for those applications which run in a multiuser, multitasking, centralized computer which provides a high degree of storage capacity, processing capacity and information management services.

3. A method for transferring and exchanging data simultaneously among various different, often dissimilar, application programs and different, often dissimilar host computer systems under the control of another computer system.

Although there are various approaches which provide partial solutions to the above requirements, presently there is no set of products designed specifically to address all of these requirements. The current available approaches fall into two categories:

A. Move the application functionality to a cost effective, user-friendly, computer workstation environment which provides both the hardward and software tools and technology to add the functionality of a user-friendly interface to the application. For most business application uses, this computer workstation environment is obtained through the use of the class of microcomputers known as personal computers.

Although this approach has been used to effectively provide the benefit of the user-friendly interface, moving the application functionality involves various amounts of reengineering and rewriting in order to move, or "port", the application to this computer workstation environment. The costs of such reprogramming often makes this approach undesirable.

In addition, if the entire application software and data files are moved to this workstation environment, the workstation capacity, due in part to its cost effectiveness, often becomes a problem and the processing capacity required to provide the user-friendly interface functions plus the application processing is often beyond the capabilities of this workstation environment. In addition, the microprocessor technologies used in these workstations are often limited in the amount of storage which the workstation is capable of accessing. Even where the storage capacity is available in this workstation environment, the problems of distributed information management often outweigh the advantages obtained.

A hybrid approach allows the application software to operate in a secondary computer workstation but the data files remain in the multiuser, multitasking, centralized computer. The hybrid approach involves the use of an intelligent terminal or computer workstation in conjunction with the reprogramming of the central computer. In this approach, the application in the central computer is programmed to direct the workstation to perform many of the user-friendly functions at the appropriate time during the execution of the application. However, adding the user-friendly interface functionality involves various amounts of reengineering and rewriting of the application program, so that the costs of such reprogramming often make this approach undesirable. In addition, such an approach, to provide the maximum benefit, would obsolete the existing terminals used with the application.

This hybrid approach has the advantage of providing centralized information management services and the user-friendly interface while retaining the capacity of the multiuser, multitasking, central computer. Since this approach involves a secondary-to-host computer link, accessing data over that link often presents severe performance limitations. In addition, the processing capacity required to manage the user-friendly interface functions plus the application processing is often beyond the capabilities of the existing mainframe installation.

B. Add the user-friendly interface functionality to a multiuser, multitasking, centralized computer which provides a high degree of storage capacity, processing capacity and information management services. However, attempts to program the centralized computer to perform the user-friendly functions are usually limited by a lack of hardware, software tools and technology to provide such functions.

The attempts to provide a solution to the overall needs may be broken into two classes, non-invasive and invasive, with respect to the host environment.

Non-invasive

The non-invasive class require no change to the host application and they thus acquire the associated benefits of lower cost and risk to the overall user community. These type of solutions range from custom software for a specific application through assorted telecommunications utility packages.

Custom solutions, while presumably attaining complete satisfaction for the specific requirements, require ground-up development and costly maintenance and have limited extensibility. Telecommunications utility packages such as MicroPhone, Crosstalk, SmartComm, etc., address the fundamentals of monitoring the host data stream, but are limited to line-by-line serially organized transactions. They focus on the automation of repetitive sequences on behalf of the user with little support of adding value to or enhancing the user interfaces and services.

Complexity of a Non-Invasive Intermediary

A non-invasive approach requires the added function to serve as an intermediary between the host environment and the end user. To function effectively, the intermediary must remain responsive both to the host application and to the end user; that is, (a) it must be able to detect a new signal from either host or user, and (b) it must be able to respond appropriately.

By one means or another, a responsive program must be able to navigate from each of the possible states it may be in to a desired successor state. For an interactive application, "state" is the current situation of the host and the client. A standard technique is:

(a) list the possible states or situations that may arise;

(b) build into the program a test that permits it to recognize which state is it in; and (c) specify the action to be performed when each state is recognized.

This fundamental structure is embodied in the case statement of standard programming languages, which starts with a test and lists the action to be taken for each of a list of possible outcomes. The action takes the program from one state to another state. In each possible new state, the program requires a new list of possible states for which to test, and a new list of actions to take when one of them is detected.

In principle, if the interaction of host and user can be described by "n" states, and if each state may be followed by another, then the application would require n! (that is $n \times (n-1) \times (n-2) \ldots$) state-tests. In practice, the number of states that must be foreseen and tested is less than n! because some combinations are so unlikely that they can be safely neglected. Nevertheless, to maintain the responsiveness of the application, the number of program branches that must be provided is proportional to the factorial of the number of states.

This explains a major drawback in the development of effective non-invasive systems: while their prototypes are small, with a low number of distinct states, the programming task is manageable. However, the process of developing and refining the intermediary program requires identifying and responding to more and more states. Thus, the complexity of the application increases enormously with even fairly small increases in the number of states that the program must recognize. Simplified prototypes, recognizing a minimal number of states, can deal with them adequately, and may give the impression that the basic problem is solved and requires only polishing or refinement. This is misleading. Using the classical state-transition method, the amount of refinement necessary to bring the intermediary's responsiveness to a satisfactory level requires an enormous increase in the complexity of the program.

One of the features of the present invention is that it provides a new method for maintaining the responsiveness of an intermediary program which frees it from the enormous increase in complexity that has been required by existing methods.

Invasive

The invasive class involves changes to the host applications, producing a tightly coupled solution wherein the host application drives a graphic interface engine at the user workstation. This requires costly changes to the host environment and the associated problems of the maintenance of dual capabilities supporting users with old and new style interfaces. This approach is very sensitive to the data communications protocols in use with the host. Technologies available provide for complete transformation of the user interface such as with MacWorkstation from Apple Computer.

Personal Computers

A personal computer is not just a small version of a mainframe host computer. Despite the rapid development of ever more powerful small computers, the two still differ strikingly. Some such differences are:

Role of a host A host computer may have access to data that is:

(a) more voluminous than a PC could contain, and (b) shared by a community of clients.

Examples are the inventory of a manufacturer, the reservations of an airline, the auto registrations of a state, and the letters exchanged by a variety of correspondents. All of these entail not just large volumes of data, but also continual input and update from many sources. A small computer devoted to the work of an individual is inherently unsuited to the custody of such an information resource.

Role of a PC. A personal computer can respond to its users with an immediacy and detail that is not practical for a mainframe host. It can track the motion of a mouse in real time, or update the details of a graphic display to produce the visual effect of motion, or synthesize vibrations that produce the effect of speech. This requires a continual transfer of immense amounts of information, but only between the PC's screen, speaker or keyboard and its processor a few inches away. A host computer could as easily perform the calculations, but a host could not transfer the information quickly or cheaply enough over the communications link to a remote terminal.

Consequences of the different roles of PC and host.

Certain kinds of tasks are better suited to large central facilities. This is partly because of the bulk of the data and the "horsepower" required to process it, but it is primarily because some data is inherently central and shared. On the other hand, "user friendly" interfaces consume a great deal of computation simply to make them visually attractive and speedily responsive. From a strictly logical point of view, computation that serves only to make an application "friendly" is irrelevant to the data-processing task. Nevertheless, it is essential to making applications attractive and easy to use. Such computation is more economically performed by the PC at the user's fingertips than at a central facility.

A great many powerful and effective application programs exist for host mainframes. In general, they were developed without benefit of the attractive human interface possible on a PC, largely because such an interface was (and remains) impractical to a terminal connected by a low-bandwidth link. They were also developed without benefit of common standards or conventions. Thus, despite the fact that they perform work of undoubted value, they remain difficult to learn, awkward to use, and almost impossible to integrate or coordinate. Their conventions are so varied that the user who at last becomes skilled in one finds that skill of little help (or even a hindrance) in starting to use another.

The business community using computer facilities needs:

1. To integrate the powers of separate computing systems in ways that permit a user to make joint use of more than one.

2. To broaden the base of employees who can make effective use of the existing computer resources.
3. To reduce and focus information presented to each class of user to what is relevant and meaningful in the user's context.
4. To reduce the time and cost required to train users to make effective use of computer applications related to their work.
5. To maximize the transfer of training between various applications by offering an integrated and consistent interface to a variety of systems.
6. To maintain the usefulness of large installed systems whose fundamental processing is valid but whose user interface is cumbersome and obsolete.

Faced with an urgent need to make better use of a large number of powerful yet hard-to-learn computer applications, the business community has been faced with a choice between unattractive alternatives: to embark on extensive training (in effect, to adapt their human users to complex and conflicting requirements of the various applications), or to rewrite and build a number of large and expensive application programs.

SUMMARY OF THE INVENTION

In order to meet the requirements stated above, the present invention uses a secondary computer communicating with one or more application programs in one or more multiuser, multitasking, high capacity, centralized computers to provide the tools and technology which allows the development and operation of adaptive, user-friendly interfaces to existing application software packages operating in the centralized computers. The invention allows the secondary computer to function as a distributed processor, operating in conjunction with the central computer or computers to perform the functions required to provide a user-friendly interface.

The invention also provides a machine-independent, information-exchange environment and subsequent method for transferring and exchanging data among applications and hosts. Furthermore, the invention provides the added functionality without requiring the application software in the centralized computer or computers to be changed in any way.

Utilizing this invention presents an environment which provides a standardized style and manner by which the user interacts with various, different application programs. The present invention distributes the functions of accessing and interacting with one or more host application programs and providing a user-friendly interface for each application, such that new or existing full-featured applications can run unencumbered in the more powerful host computer or computers, while the majority of the power of the secondary computer can be used to present the user with a user-friendly interface to the application or applications. Thus, many of the performance limitations of a secondary computer are avoided.

The secondary computer, which can be described as a very intelligent workstation, changes the user's environment from one in which a user must adapt to a fixed interface for each application and a fixed method of operating the secondary computer (or alternatively, a present-day computer terminal) to one in which the user defines the way he wishes to interface to the application even though the application interface in the actual host application remains fixed. As a result of this invention, there is no need to modify the vast libraries of business application software to provide such an interface. Transitions in conditions required to accomplish that interface are performed by the secondary computer through the architecture of this invention.

Since the application or applications remain in the host computer or computers and only a relatively small set of translation instructions, called an Application Interface Module (AIM), must be downloaded to be executed by the secondary computer, the problems associated with the relatively small memory of the secondary computer are overcome. Also, since only the AIM and data that has been used or changed by the user needs to be moved from or to the host system, performance delays typical of more conventional systems are overcome.

Additionally, since the environment created by the invention fully supports multiple sessions in support of applications running on a single host or on separate hosts, and since the environment translates all applications user interface operations such that, while being operated on by way of the secondary computer, they all have a common data and interaction form, interchange and integration of information between any application becomes a readily available facility to the user. In addition, data or graphic information derived from the host application but created in the secondary computer can be appended to the information that is a part of the application in the host system.

That is, the secondary computer presents the same familiar user-friendly interface to the user for a variety of application programs to be run, thus eliminating the need for the user to learn the often complicated details of interfacing with a variety of different application programs, while still making available to the user the benefits of these application programs. Additionally, this solution avoids the complexity and maintenance costs of distributed information management.

A multiuser multitasking host computer employing the present invention and using the secondary computer as a terminal can continue to be a node in a networking environment, should the user's needs require a network.

The "WHOOP"

The central component of the present invention is a unit called the WHOOP ("Watch Host Patterns"). The WHOOP notes, interprets and responds to communications arriving from the host program. It responds not to particular characters or sequences in the communication, but to the information that they convey. Based upon its review of the arriving information, the WHOOP notifies the AIM that it has detected a condition of interest to the AIM. Thus, the signal that the WHOOP transmits to the AIM is not a translation of what the host sent, but notice of a deduction that the WHOOP has made.

This may be clarified by an example. At the beginning of almost every session with a host, the host and the terminal transmit opening formalities such as an exchange of identifications and passwords. The end user and the AIM are indifferent to the specifics, but vitally concerned with the general outcome. The WHOOP need not pass on details of port number, log-on time, and system logo, or the various codes and messages that the host may send to indicate troubles. Instead, the WHOOP notifies the AIM which of several broad outcomes has transpired. The AIM may request signals for the following:

We have established normal communication and may now proceed;
We can't get through now, but may try later;

Out physical communication is OK, but we have been denied access;

We have encountered a situation that doesn't match anything we recognize.

This simple example illustrates two aspects:

The categories reported are established by the AIM, not by the host.

The notification the WHOOP sends does not repeat what the host said (although it could do so if desired), but notifies the AIM which of various contingencies has occurred.

The AIM in turn need never mention these details to the end user. When the process is proceeding normally, the AIM receives from the WHOOP the confirmation that the process is progressing as foreseen, and continues the work at hand.

The WHOOP's function is not to translate all it sees, but to review what it sees in the light and context of the AIM's current needs, and to notify the AIM when it concludes that it has identified a situation that the AIM has asked about.

Linearization of the State Transition Table

The earlier discussion described the explosion of complexity which results when there is a module of the intermediary program corresponding to each state of the host-user interaction, and each module must maintain its own table of events that signal a state change and actions required in response. The WHOOP of the present invention radically simplifies the transition table by providing a single table for the application as a whole, responsible for all responses and transitions. In principle, the size of the table is proportional to n (the number of distinct states) rather than to n!

Functional Components of the Invention

The invention consists of the design and realization of the WHOOP and its linkage to several essential services.

For each of the host programs with which it interacts, the secondary computer establishes what can be called a virtual device (or simply "device" for short). The services that comprise each device are as follows:

1. Link. The secondary computer manages the connectivity between it and each host. Since there may be multiple links, the software that maintains them must be prepared to operate with multiple different connectivity arrangements (e.g. SNA, ASYNC, etc).

2. Session. A session consists of all transactions between a specific host program and the secondary computer. Since there may be multiple sessions with one or more hosts, the software that maintains them must be prepared to multiplex and demultiplex communications according to the session for which it is appropriate.

3. Presentation space. For each session, the secondary computer maintains information about the state of the display that would exist if the host were communicating with a conventional terminal. The manager of the presentation space thus performs some or all of the functions of a terminal emulator optimized for the WHOOP, but does not necessarily display what is in its presentation space or transmit responses from the presentation space back to the host.

4. WHOOP. The WHOOP reviews the presentation space and responds to patterns that the AIM has asked it to look for. The functions of the WHOOP are described further below, and elaborated on in the body of this application.

5. Application program interface. A mechanism to pass information from the WHOOP to the AIM, to manage displays at the PC, and to accept input from the secondary computer.

Functions Of The WHOOP

In order to provide an encompassing solution for the varying host interface characteristics, the WHOOP is based on a unique technology designed for handling the data from the host application and decomposing it into identifiable and standardized transactions to be processed by the AIM. The end result is that the conversation between the AIM and the host is broken down into individual transactions even though the conversation may be serial in nature with no explicit transaction boundaries. The main functions performed by the WHOOP are:

1. Accumulation. The WHOOP accumulates device independent information from the device's presentation space. That is, it maintains an image of the presentation and the information from its space, but in general does not review it continuously, but waits until a trigger event prompts it to do so.

2. Trigger. The trigger mechanism indicates to the WHOOP when it is time to review the accumulated image of the presentation space. The WHOOP then examines the presentation space image to see whether a message of interest has arrived. Between trigger events, the WHOOP can ignore changes to the image by the device's presentation space. The trigger has the following abilities:

A trigger event may be keyed by something in the host transmission (for example, the end-of-line character sent by the host). Or it may be a change in the status of the communication link, the absence of activity for a certain amount of time, or the detection of an error condition, etc.

A trigger event may also be independent of the host, for example an event generated by the PC clock or by the AIM.

The trigger event is continuously redefinable. The AIM can thus control the determination of what events should trigger the WHOOP's review of the accumulated image in a continuous manner to reflect those appropriate to the current context of the AIM's communications with the host application.

Within this function, the WHOOP discriminates multiple concurrent trigger contexts. The process of managing a conversation with multiple topics requires the parallel discrimination of multiple trigger contexts, any of which may occur next in time.

3. Discrimination. When a trigger event occurs, the WHOOP examines the presentation space to determine which, if any, has occurred of a list of possible situations that the AIM has asked it to report. In this examination process, it must first decide whether sufficient information has been received to identify one of the target situations. A major component of the invention is the method of examining the presentation space to discriminate between situations.

4. Decision. When a target situation has been discriminated, the WHOOP selects an action to take by sending an appropriate notification to the AIM. This results in the generation of a standard message to the AIM.

5. Dynamically Reprogrammable. The target list of situations to be discriminated and actions to be taken is under dynamic control of the AIM. This permits the discrimination of target situations and/or the actions to be taken when each is detected to depend upon the context, as influenced both by transmissions received from the host application and input received from the human user. The AIM may at any time update the list of situations to be discriminated or signals to be sent, and their relative priority.

The major task in developing an AIM is to identify and characterize the list of situations of interest and actions to be reported in response to the changing circumstances of the host and the changing requests of the human user.

The present invention brings all the benefits of the non-invasive class of solutions without the cost burden associated with the prior art non-invasive approaches discussed earlier, with the addition of the key element of a general purpose host interface communications approach. The present invention involves the interposing of agent process AIMs between the user and the host application or applications. The AIM deals with both the user interface and the host interface asynchronously and may thus provide the optimum user service independently of the host application cycle.

The present invention provides a technology for managing the host interface that relieves the AIM of dealing with non-significant changes while at the same time being prepared for any eventuality.

The present invention, coupled with an object oriented application building tool, such as Hypercard ™, brings the ability to marry new user interfaces to existing mainframe applications with all of the benefits and none of the drawbacks of any of the prior art approaches.

The present invention provides an attractive approach by leaving both users and host programs as they are, but interposing a family of AIMs to act as mediators between them. This approach has the following advantages:

An attractive easy-to-use interface can be prepared for host applications that previously lacked it.
The user interface can apply common conventions and standards to a wide variety of applications. New users are thus shielded from the vagaries and inconsistencies of the host system. This
  reduces the time required to train personnel
  permits "seamless" migration for the user community across changes to the host system, applications and the host system application programs on the connectivity requirements between the host and the secondary computer.
It is unnecessary to rewrite existing host applications. The host can continue to serve its expert users in the established way while its new users take advantage of a radically revised interface without change or even without collaboration at the host. In this sense, the AIM and WHOOP are a non-invasive adjunct to the host.

The major thrust of the present invention is a method to:
  Analyze transmissions received from various host programs.
  Abstract from the information relevant to the user at the secondary computer.
  Manage an independent display of the information it has abstracted from the various host programs.
  Manage interaction with the human user at the secondary computer.
  Generate and transmit commands to the various host programs that:
    reflect the effect of the human user's wishes and decisions,
    maintain the conventions that each host program expects,
    do not require the human user to learn or even to be aware of the conventions and command language of the various host programs.

DESCRIPTION OF THE PREFERRED EMBODIMENT

Description of the features and operations of the present invention are given in the publications "Mitem View ™ Manual", Beta Release 1.0621, September 1989, and "Mitem View Developers Toolkit for Creating an Online Enterprise", Reference Manual, Version 1.0A, March 1990, both by Mitem Development Corporation. Both of these publications are incorporated herein by reference.

Figure 1:
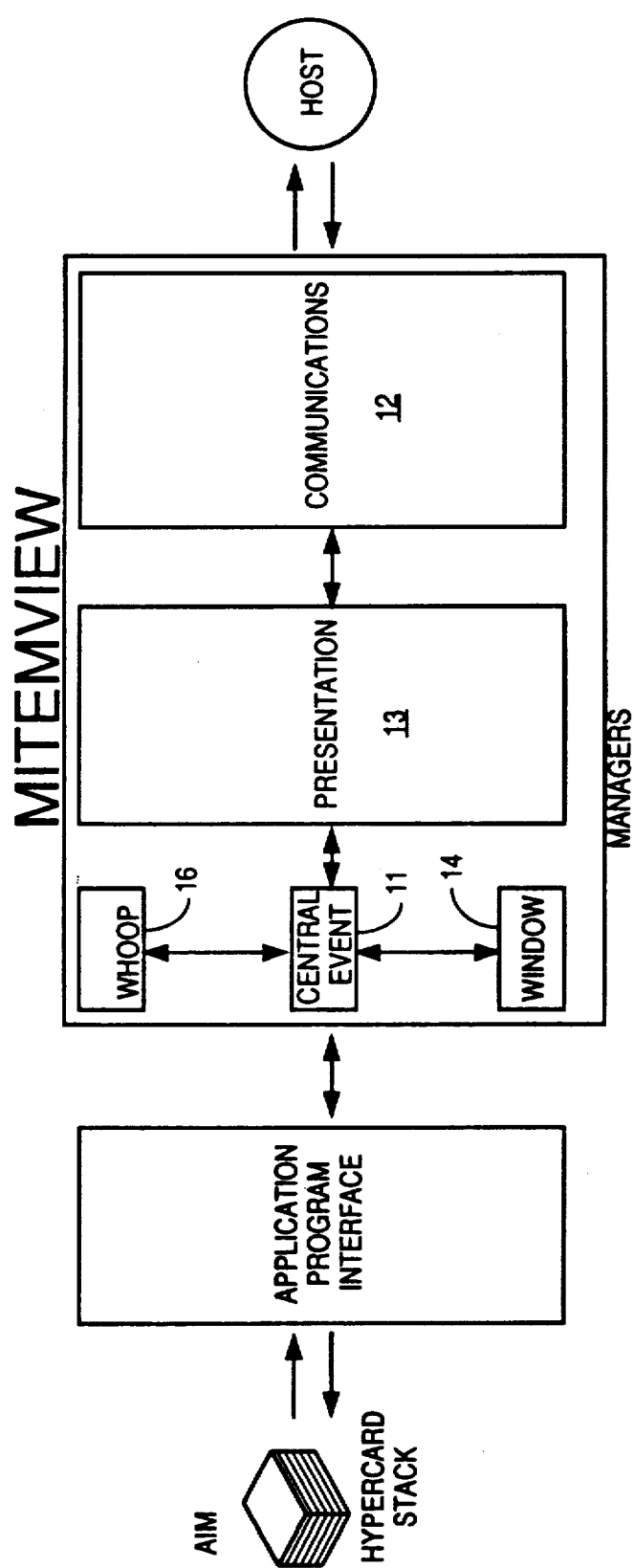
FIG. 1 is a schematic representation of the overall configuration of the elements of the present invention.
Figure 2:
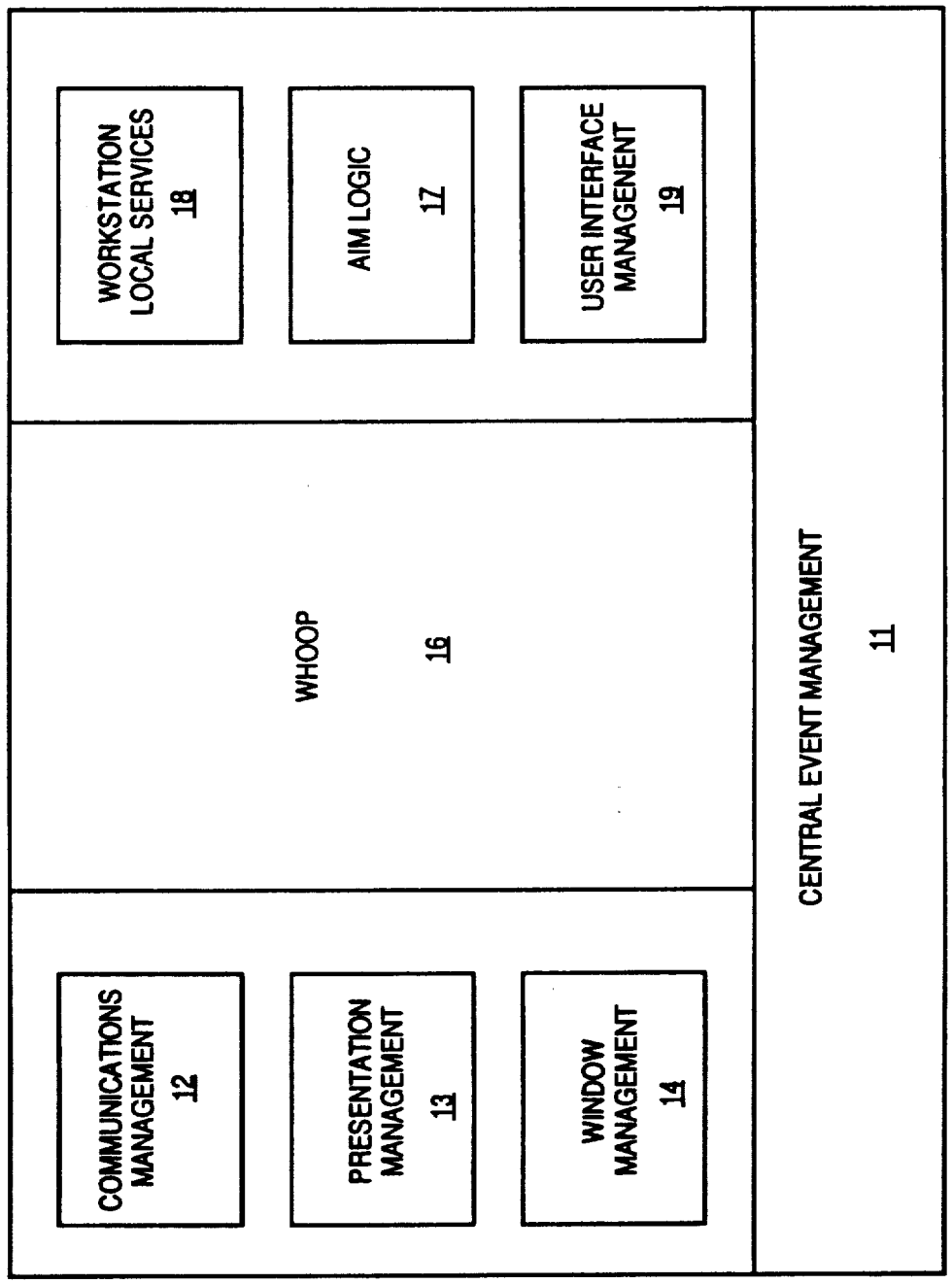
FIG. 2 shows the architectural building blocks involved in the present invention.

FIGS. 1 and 2 illustrates some of the elements employed in this invention. They include a central event management element 11, a communications management element 12, a presentation management element 13 and a window management element 14. As shown in FIG. 2, these elements interact through WHOOP element 16 with AIM logic 17, workstation local services 18 and user interface management 19.

Figure 3:
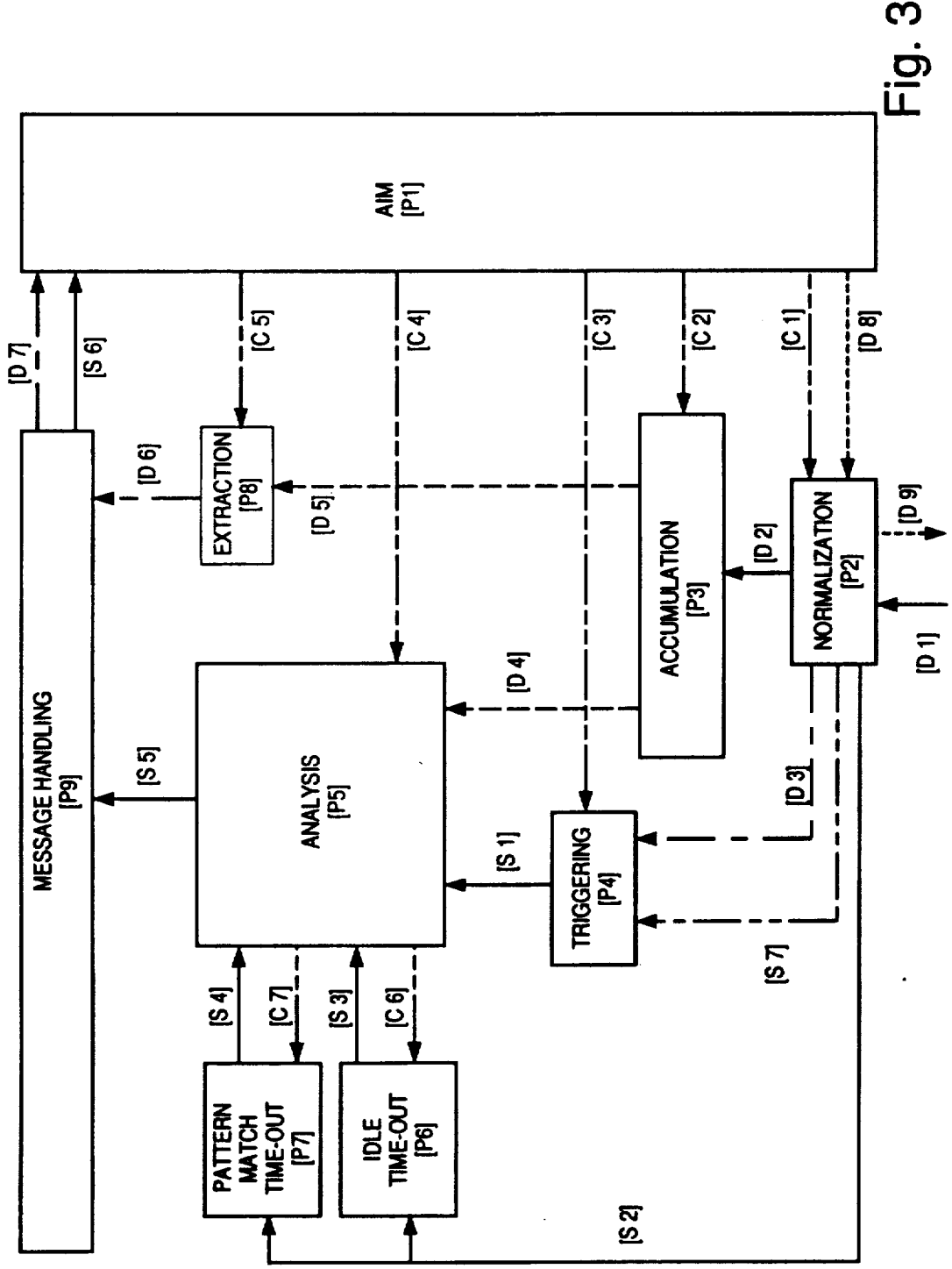
FIG. 3 shows the relationship among the elements of the invention and the different control, signal and data interfaces.

FIG. 3 illustrates the operation of the present invention in more detail. In FIG. 3, lines labeled "C" represent control lines, those labeled "S" are signal lines and those labeled "D" are data lines. The AIM module P1 supplies a normalization control on control line C1 to normalization portion P2. The functions performed by normalization portion P2 are as follows.

C1—Normalization Controls

Figure 4:
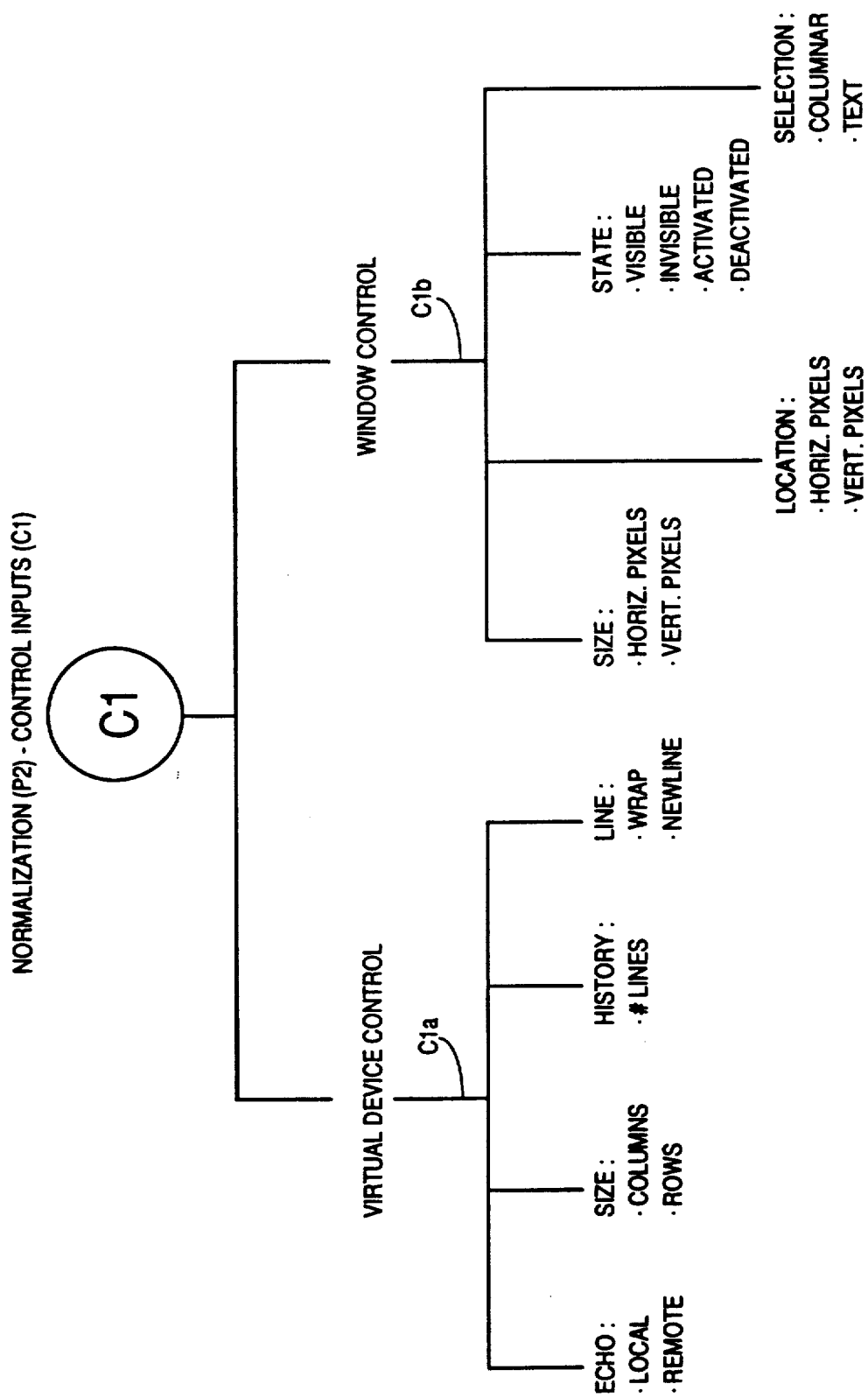
FIGS. 4–14 are flow charts showing functions of the different elements of FIG. 3.

These vary locally controlled characteristics of presentation personality such as auto-newline, 80/132 columns, etc. Examples of inputs on control input C1 are illustrated in the flow chart of FIG. 4 and include a group of Virtual Device Controls (line C1a) and a separate group of Window Controls (line C1b).

D1—Data Inputs

Figure 5:
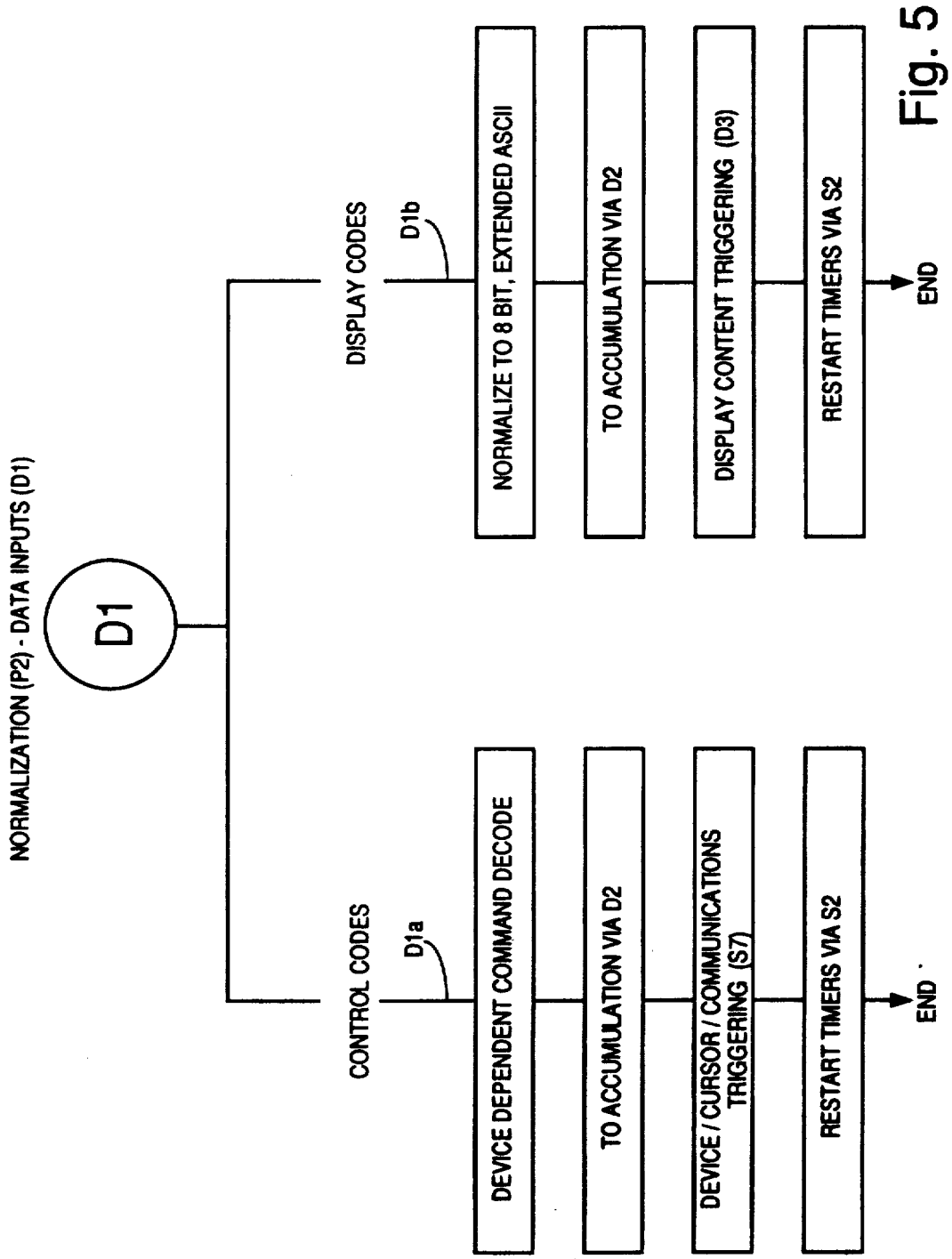

Typical operations performed in normalization P2 in FIG. 3 on data input D1 are illustrated in the flow chart of FIG. 5. The input functions on data input D1 can include Control Codes (line D1a) and Display Codes (line D1b). The Control Codes function to process control characters such as screen address information into changes to cursor location and/or changes to accumulated data such as erase field, etc., into normalized commands to accumulation P3. The Display Codes functions process non-control characters directly into normalized ASCII characters to be placed in the accumulation buffer. Data inputs on D1 also issue "activity" signal S2 for relevant host data and/or controls received.

D8—Virtual Key Input

Figure 6:
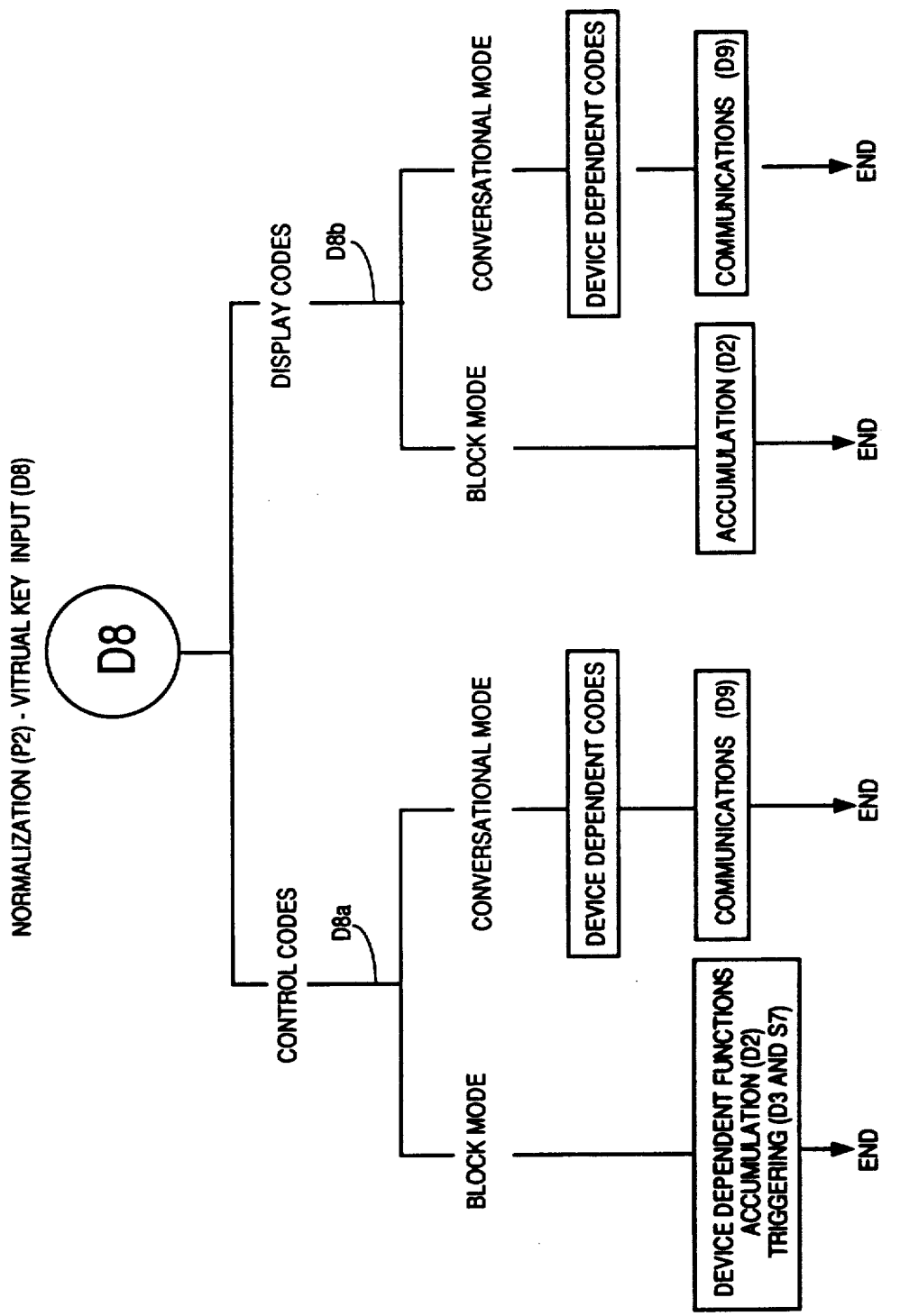

These are exemplified in the flow chart of FIG. 6. The virtual key input D8 from AIM P1 is processed according to presentation type (terminal emulation). Control function keys (line D8a) are interpreted either locally (e.g. block mode 3278, etc.) or sent character by character to a remote host (e.g. as in full duplex VT100) in appropriate presentation form as output D9.

Display keys (line D8b) for block mode information is entered into a data field in a local buffer. Full duplex character-by-character information is sent to the host by way of the associated communications facility.

P3—Accumulation

Accumulation portion P3 in FIG. 3 receives a control input C2 from AIM P1. This controls processes such as buffer clear, scroll back and forward. Accumulation P3 also receives input on line D2 from normalization P2, representing normalized control and data. This results in processing data characters by placing them at the cursor location in the data buffer and advancing the cursor one position and applying appropriate line wrap rules.

P8—Extraction

Figure 7:
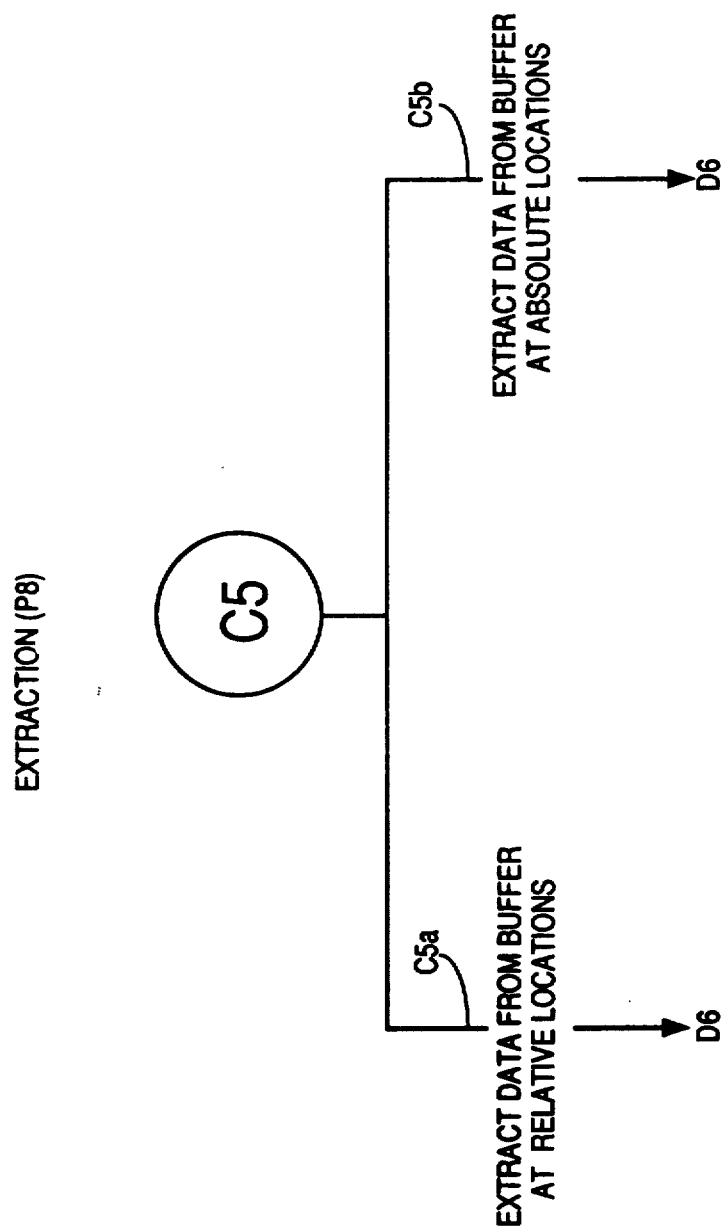

This element in FIG. 3 receives a control input C5 from AIM P1 representing an extraction control request. As shown in FIG. 7, P8 operates to extract data from Accumulation P3 in either cursor relative locations (line C5a) or absolute locations (line C5b) by way of line D5 according to a mask in the applications data base, returning character string(s) to the user workspace by way of D6.

P4—Triggering—Control Inputs C3

Figure 8:
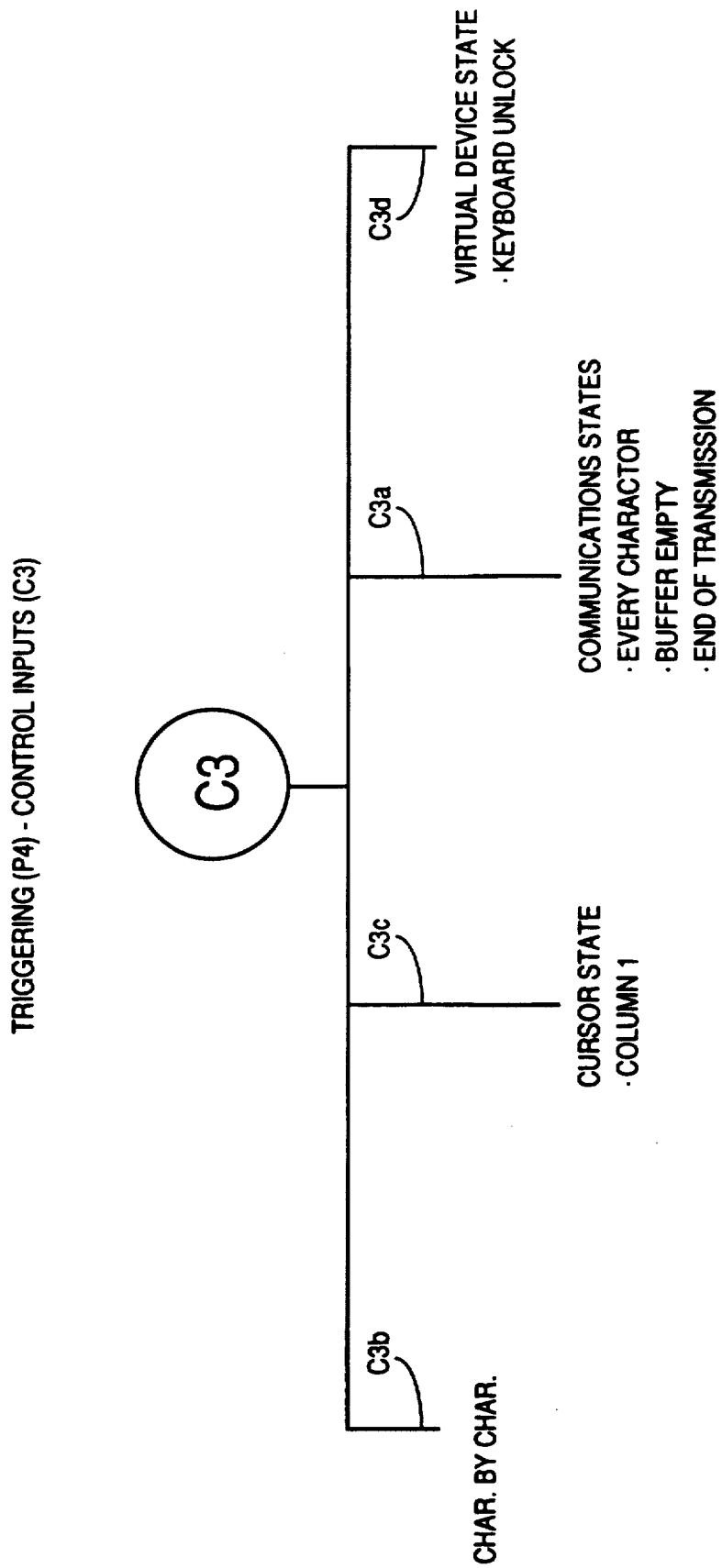

This portion receives a trigger control input C3 from AIM P1. As shown in FIG. 8, this input sets up pattern check trigger conditions for current application needs. These include Communications States (line C3a) for Every Character, Empty Data Buffer and End Of Transmission. Also included are Character-by Character control (line C3b), cursor state (line C3c) and virtual device states (line C3d), the latter including keyboard unlock. The trigger conditions may be continuously changed to meet the current needs of the host application interface.

P4—Triggering—Data Input (D3) Normalized host presentation data

Figure 9:
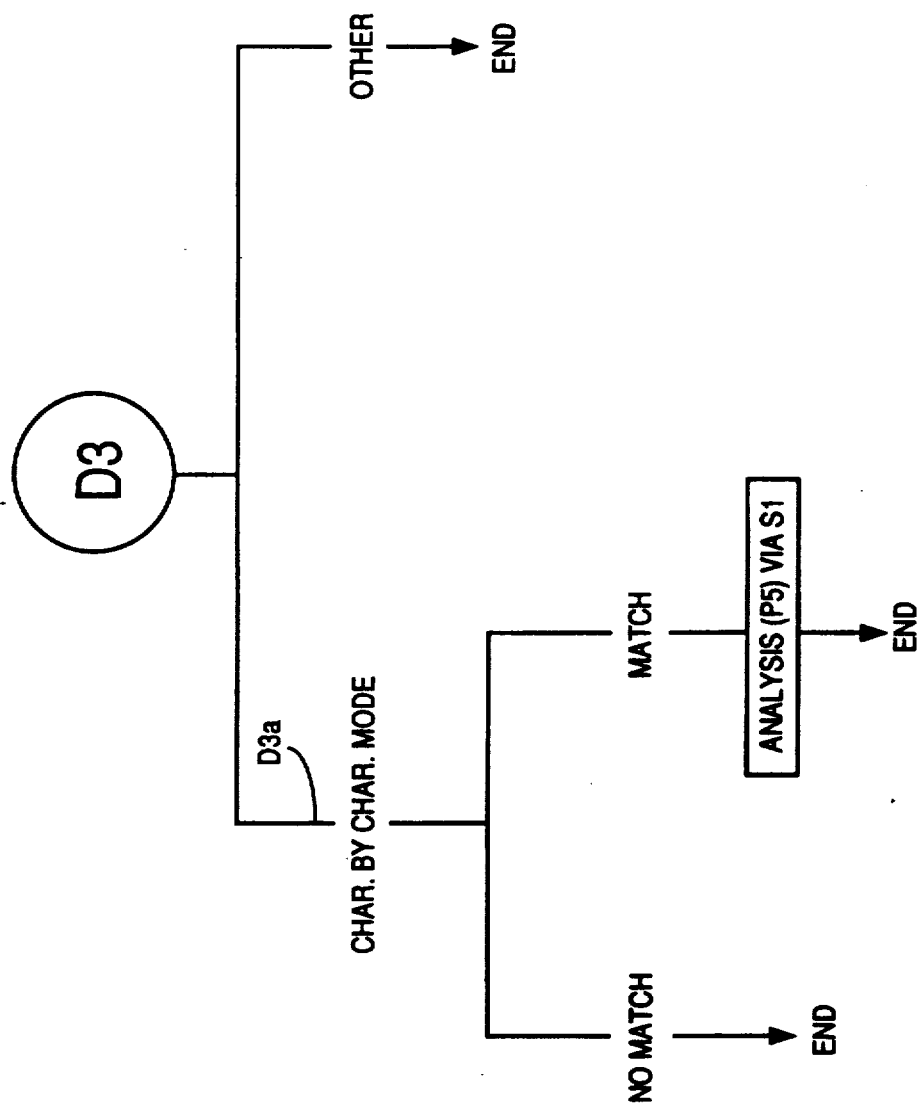

This is shown in FIG. 9 representing the input D3 from normalization P2 to triggering P4. It includes a character-by-character operation (line D3a) having options of match or no match to the triggering condition. If a match is found, information is sent to analysis P5 by way of signal line S1.

This processes both commands and normalized display characters. Display characters are processed against the specific character trigger condition and also for the every-character trigger condition. Controls such as the normalized "newline" and keyboard unlock are checked against their unique trigger conditions. Buffer empty status is processed against its unique trigger condition. Signal S1 is generated for any valid match condition specified by the AIM developer by way of input C3 to triggering P4.

P4—Triggering—Signal Input (S7)

Figure 10:
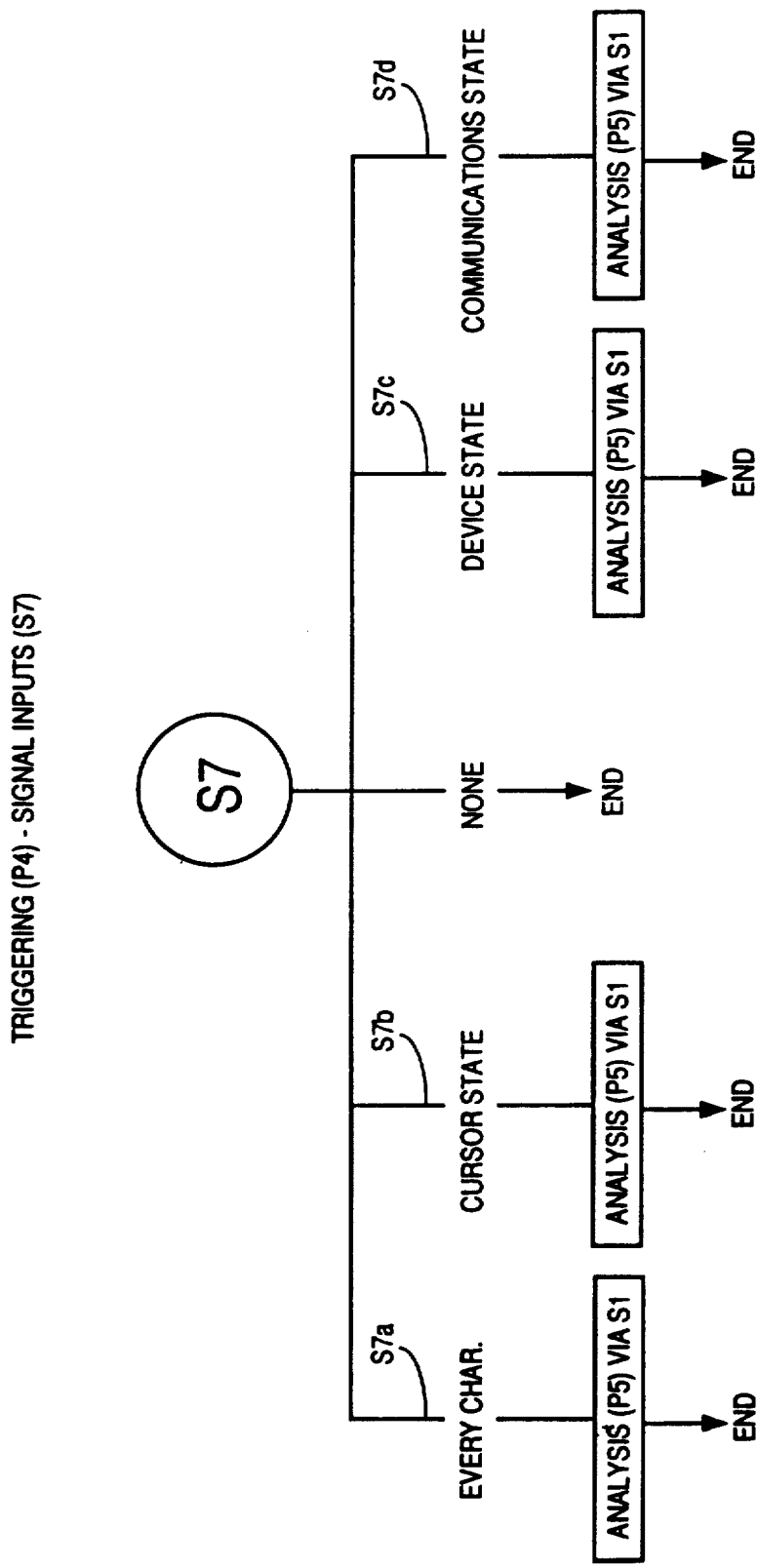

The signal input S7 to triggering P4 from normalization P2 conveys conditions as shown in FIG. 10. These include Every Character (line S7a), Cursor State (line S7b), Device State (line S7c) and Communication State (line S7d). In each line, in the situation of a triggering condition occurring, information is sent to analysis P5 by way of signal S1.

P5—Analysis Signal Inputs (S1, S3 & S4)

Figure 11:
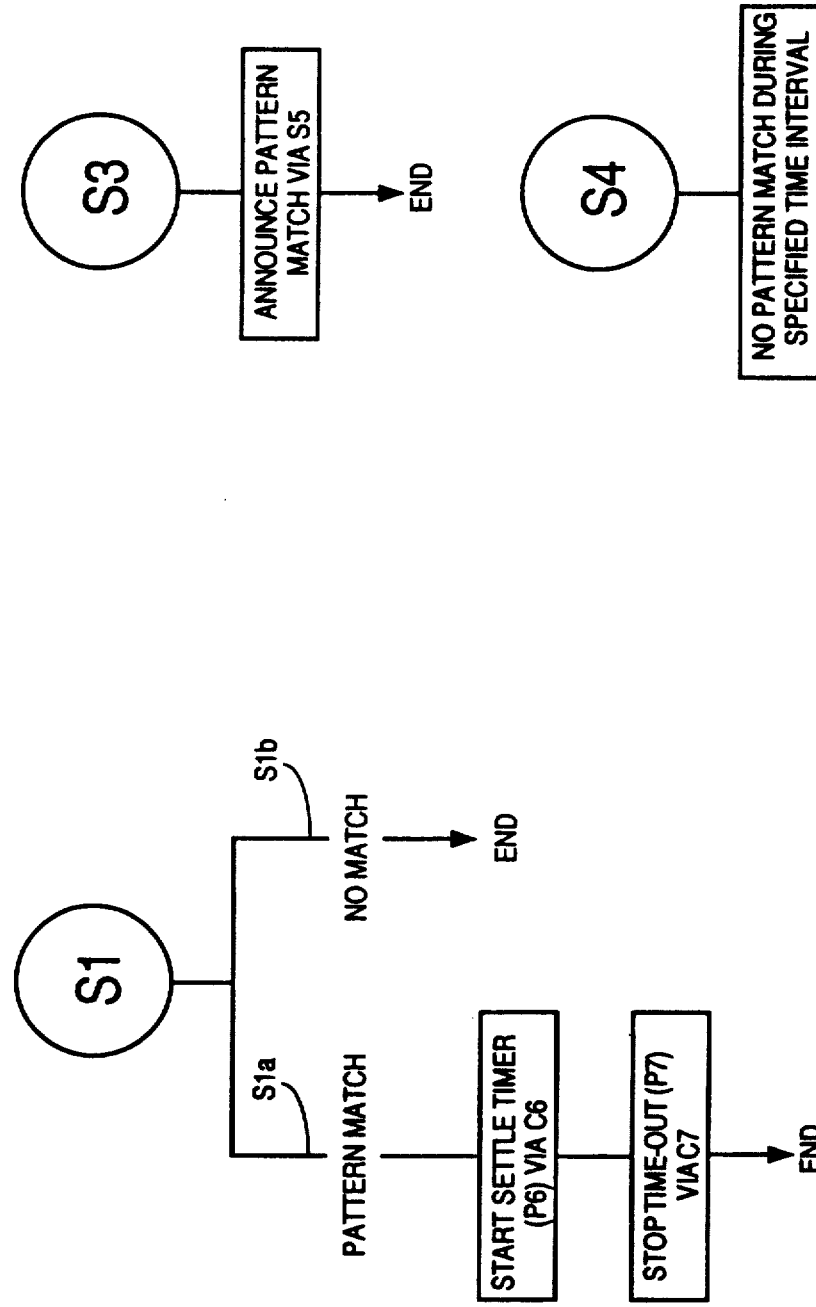

The signal inputs to analysis P5 are shown in FIG. 11. The input S1 is from triggering P4. This results in examining a list of current patterns in a last in/first out manner (LIFO) until one matches (line S1a) or the end of the list is reached with no match (line S1b), using pattern specifications from the user data base and the accumulated data supplied by way of D4 from accumulation P3. If the end of list is reached without a match, then no further action is taken. If a pattern match is obtained, idle timer P6 is started by way of control line C6 to provide a stable pattern check.

The input S3, Idle Timeout, to analysis P5 indicates that the pattern is stable. This generates signal S5 to message handling P9 indicating a pattern identification.

The input S4, Match Time-out, indicates that no pattern has matched during the specified time interval. This results in sending a time-out signal by way of S5.

P5—Analysis—Control Inputs (C4)

Figure 12:
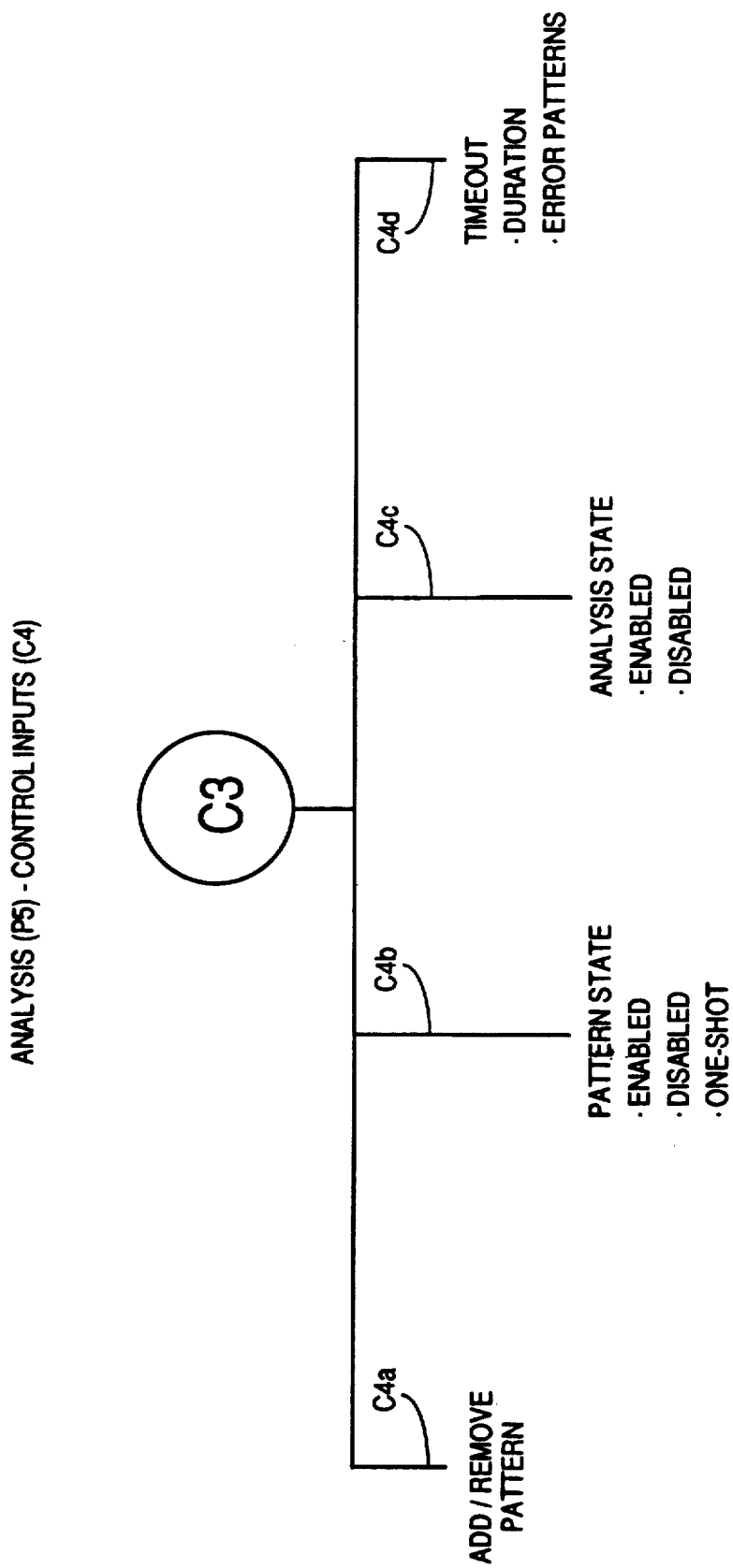

The control inputs to analysis P5 from AIM P1 by way of control C4 are shown in FIG. 12. These include add/remove pattern (line C4a), pattern state (line C4b) made up of enabled, disabled and one-shot, an analysis state (line C4c) and a timeout (line C4d).

P6—Settle Timer

Figure 13:
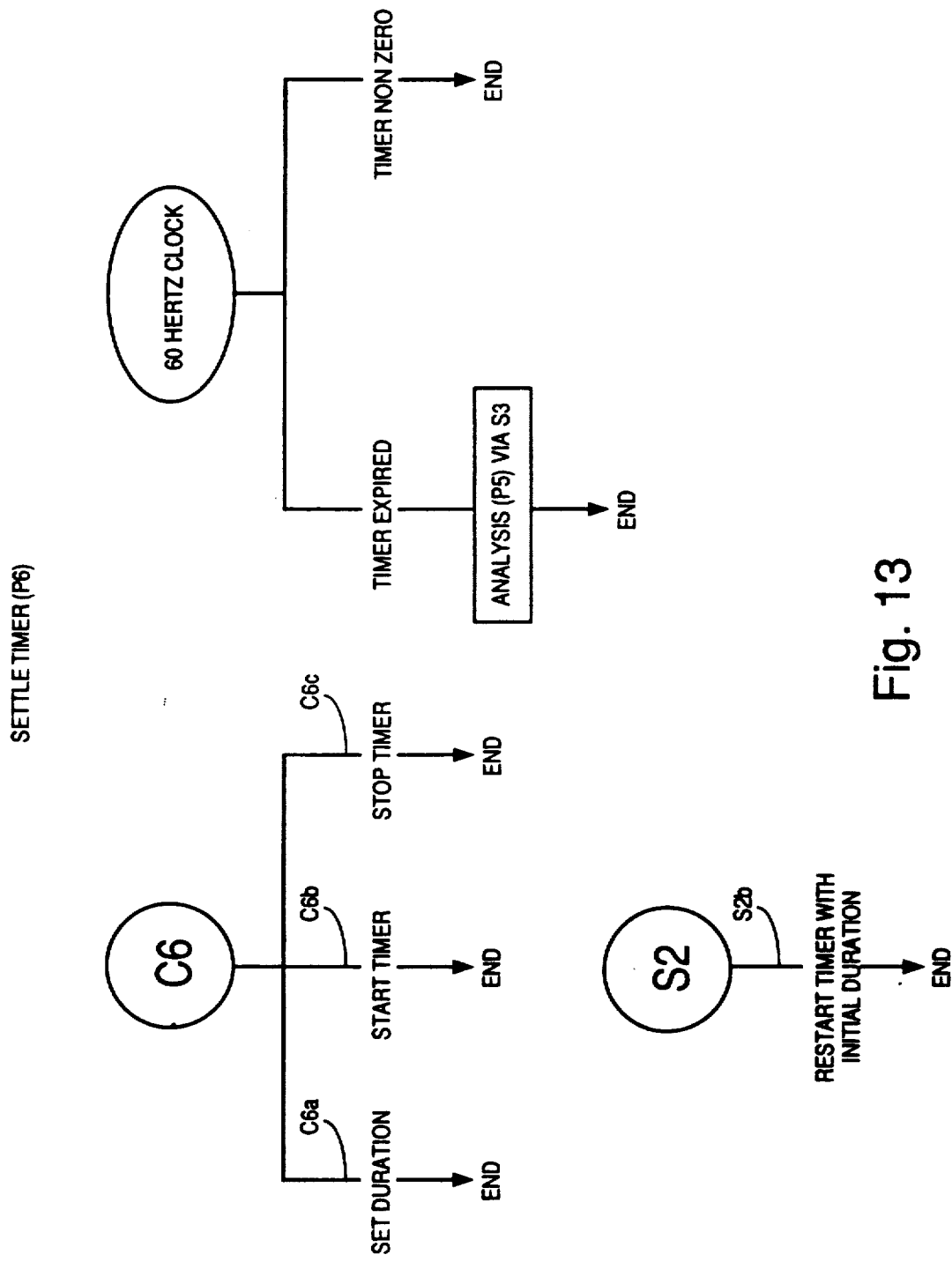

The operation of settle timer P6 is shown in FIG. 13. This includes the operations of set timer duration (line C6a), start timer (line C6b) and stop timer (line C6c). FIG. 13 also shows the restarting of settle timer C6 by signal S2 (line S2a).

P7—Pattern Match Time-Out

Figure 14:
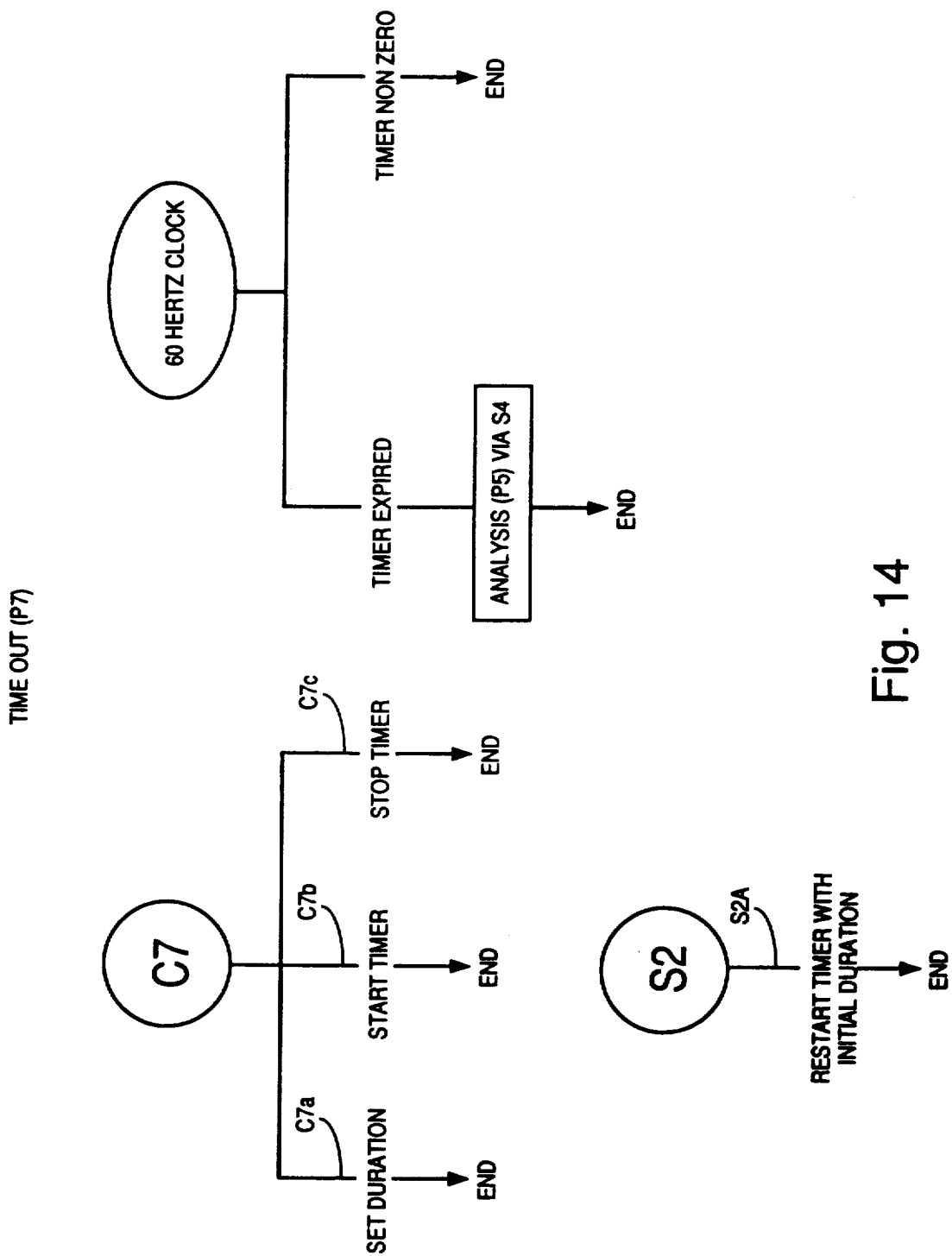

Similarly, FIG. 14 shows the operation of pattern match timer C7, including the steps of setting timer duration (line C7a), start timer (line C7b), stop timer (line C7c) and the restarting of timer P7 by the signal on S2 (line S2b).

Pattern Match Timing Parameters

The following features of the invention provide for control of pattern match conditions.

1. One-shot (pattern automatically disabled after a match).
2. Exclusive pattern (matches only if it has not previously matched at the current location in the transaction data buffer).
3. The host session may be selectively frozen at the time of a match or permitted to continue processing for greater simultaneity.
4. Refinement of the end-point of the host application's response can be achieved by the application of a settle timer that is automatically restarted by host activity.

Pattern Match Locating Parameters

The requirements for pattern locating types are determined predominantly from the user interface device characteristics. Teletype, line-at-a-time style with a scroll-up feature utilize mainly cursor (data pointer) relative features, while block mode devices such as IBM 327x devices operate in a full screen mode and utilize absolute x,y addressing in the two dimensional data buffer. Examples are:

1. Cursor Relative—the pattern's origin within the data accumulation buffer is the x:y co-ordinates of the cursor (data pointer).
2. Absolute—the pattern's origin is absolute within the data accumulation buffer.

3. Combinations of absolute and floating x and y co-ordinates within the data accumulation buffer.

4. Experience with the user interface of various IBM mainframes systems as presented on standard character oriented visual display terminals has introduced an additional requirement for pattern processing. During certain phases of the application cycle the host may present fixed input information at the bottom of the screen, with its associated "key entry" cursor, while displaying responses to input as one or more lines scrolling down the screen.

In these circumstances, the user enters responses in the field at the bottom of the screen and the host responds in the next available line down the screen. The host responses are neither cursor relative (have no predictable offset from the data entry cursor), nor screen absolute (the different lines may vary in number every connection). Users identify the current response from the host by locating the last information written in the non-entry area of the screen (i.e., not necessarily where keystrokes have been entered).

The present invention avoids areas of the screen that are not of interest by excluding them from the field of examination. This includes, firstly, the use of a mask to define an area of interest and, secondly, the use of an additional pivot or origin type for patterns and masks. This new pivot is the address of the Last Visible Character (LVC), excluding blanks/spaces, written to the screen within the area defined by the aforementioned area of interest mask.

During the development process the application of a mask defining the area of interest causes an additional pointer to appear in the terminal emulation window showing the location of the Last Visible Character (LVC) displayed. The developer may then optionally specify patterns and/or masks as being relative to the LVC in the same way as can be done for cursor relative operations.

Data from Host

The data communication protocol layer buffers information characters after stripping them of any enveloping protocol information. The communications layer delivers these buffered characters to the presentation layer either one at a time or in groups according to the characteristics (Time and/or protocol dependent) of the data communications protocol. The presentation layer then decodes the information and formatting codes and applies these as changes to the presentation (virtual device) buffer.

Trigger Conditions—"WHEN to check"

The requirements for trigger conditions are dominated by the differing characteristics of the user presentation devices (CRT/VDT/VDU) and the supporting data communications service. The objective is to define the conditions under which the host may be characterized as having completed a response to a previous input.

The WHOOP of the present invention monitors the state of the device buffer for valid conditions for checking patterns according to the previously established "When to check" criteria. These criteria include:
1. Every Character
2. Cursor moved to the start of the next line (Newline)
3. Cursor at a specific location in the data buffer
4. Specific character processed
5. Communications buffer empty
6. Visual Display Keyboard unlock
7. Communications session turn-around The WHOOP steps through all enabled patterns, checking each in turn until one matches or until it has exhausted the list. In either case it then awaits a further valid "WHEN" condition before rechecking any patterns. If a valid "WHEN" condition is encountered, the WHOOP applies its pattern recognition process according to the previously supplied patterns against the accumulated virtual device buffer. These are applied in a LIFO manner. Disabled patterns are ignored whether as the result of explicit AIM action or as the result of a "one-shot" action.

The WHOOP reestablishes its point of reference in the data buffer for each pattern according to its respective origin mode. These different modes support operations with diverse host computer systems with conversational character-at-a-time interfaces to block mode, forms type interfaces. The origin mode of each pattern may be defined as:
  Relative to cursor location
  At an absolute location
  Any row and/or any column
  LVC Patterns consist of one or more slits (single row deep) combined into a mask which are applied to the accumulated virtual device buffer to match a predefined string of data. The information selected by the slits in the mask is compared with the data string in a concatenated form to complete the pattern matching process. If a settle time was specified, then the reporting of the pattern match is delayed until the settle time has expired without any activity from the host. Host activity at any time restarts the whole process from the beginning.

If a pattern is matched in all of the above respects, the AIM is notified of its arrival. The reporting may be selectively synchronous or asynchronous with respect to the state of the host data buffer contents (preselected on a pattern by pattern basis). Synchronous reporting of pattern matches freezes the host data stream until the AIM has processed the event.

Asynchronous reporting provides for greater simultaneity by permitting the continued processing of the host data buffer. Asynchronous reporting of pattern matches is applicable when the contents of the data buffer does not need to be examined at the time of a pattern match. The pattern match is reported in the next convenient application processing time slot.

Patterns may be added or subtracted, enabled or disabled to provide refinement of the set of host messages that are being looked for at any time. Patterns themselves may be further refined by their mode of operation such as "one-shot" and "gamma". "One shot" patterns automatically disable themselves after a match has been signaled by the WHOOP. They may be explicitly re-enabled at any time. "Gamma" patterns, having been matched and signaled, will not rematch until they match at some other location in the virtual device buffer.

DATA FLOW EXAMPLE

Shown below as Example I is a simplified example of the operation of the present invention utilized in connection with the control of a Hayes modem.

These are two requirements for getting a Hayes modem under control. The first is to define the configuration of the communication facility involved. In Example I, it is assumed to be running at 1200 bits per second and seven bits per character, using X-on, X-off protocol, as shown in the right hand column in Section 1 of Example I, "Set-up Communication Facility." The second requirement is selecting TTY for the normalization process. This defines the fact that for this particular communication session, ASYNC will be used and TTY emulation will be used for the normalization rules for interpreting commands and orders. This is the first time C1 is used to define the communication session. Additional sessions are handled in a similar fashion.

EXAMPLE I

| (Section 1) | Set up communications facility | | | | | |
|---|---|---|---|---|---|---|
| Protocol: | Async | i. | Set up communications facility | | | |
| | | | X25 | | | |
| | | | TCP/IP | Async | 1200 | 7e |
| X-OFF | | | | | | |
| | | | etc | | | |
| Terminal: | TTY | | | | | |
| | | | VT100 | | | |
| | | | 3278 | | | |
| | etc | ii. | Select TTY emulation in Normalization P2 via control C1 | | | |
| 2) Get the HAYES compatible modem under control | | | | | | |
| Get the modem into a known state | | | | | | |
| | | i. | Select pattern to look for "OK" response via control C4 [O][K] Cursor Relative → [ ] Settle Time = 5 (0.5 sec after last character received) | | | |
| | | ii. | Set to check whenever input buffer empties via control C3 | | | |
| | | iii. | Set up pattern match time-out via C4 | | | |
| | | iv. | Enter "ATZ/r" through emulation keyboard via D8 | | | |

For a TTY emulation with a Hayes modem, the user types ATZ, hits the return key and the modem will respond. The Z in ATZ is a command interpreted by the Hayes modem to tell it to reset back to another state. If everything is satisfactory, "OK", the user gets back an indication. The user may not get anything back because the modem may be dead or not plugged in. The cursor temporarily ends up on top of the O because the system provides a carriage return, then a line feed.

At this point the system is awaiting a response from the external system (in this case a Hayes compatible modem). The Hayes modem processes the ATZ command upon receipt of the carriage return, resets itself and responds with OK followed by CARRIAGE RETURN and LINEFEED.

The characters echoed by the external system (Hayes compatible modem) are processed through normalization P2 into accumulation P3 and triggering P4. In this example, triggering is set on empty buffer only and thus the analysis P5 (pattern matching process) will be activated almost every character due to the speed at which input is processed. The analysis process checks the set of selected patterns in a LIFO manner against the accumulated screen image and cursor conditions looking for the correct combination of the two to occur.

In the present example, the analysis P5 is triggered with the complete pattern (blank under cursor at X,Y and the string OK starting at origin X,Y−1). Analysis P5 defers announcing the match until the pattern match settle timer P7 expires. Any additional communication from the host restarts the timer and potentially results in an alternative pattern match. When the settle timer expires, the signal S4 causes analysis P5 to signal the identifier of the matching pattern on S5 to message handling P9.

If the pattern match timer P7 expires, then analysis P5 signals a TIME-OUT by way of signal S5. The message handling P9 queues the message until the next application time slice at which accumulated message(s) are presented to the AIM.

| 3) | Get Connected | | |
|---|---|---|---|
| | Dial the number | | |
| | | i | Select pattern to look for "CONNECT" response by way of control C4 Cursor [C][O][N][N][E][C][T] Relative → [ ] Settle Time = 5 (0.5 sec after last character received) |
| | | ii | Select pattern to look for "BUSY" [B][U][S][Y] Cursor Relative → [ ] Settle Time = 5 (0.5 sec after last character received) |
| | | ii | Set to check whenever input buffer empties via control C3 |
| | | iii | Set up pattern match time-out via C4 |
| | | iv | Enter "ATDT 123-4567/r" through emulation keyboard via D8 |

At this point the system is again awaiting a response from the Hayes compatible modem. The Hayes modem processes the ATDT 123-4567 command upon receipt of the carriage return and dials the number.

The characters echoed by the external system (Hayes compatible modem) are processed through normalization P2 into accumulation P3 and triggering P4. The case under study is set for triggering on empty buffer only and thus the pattern matching process will again be activated almost every character due to the speed at which input is processed. The analysis process checks the set of selected patterns in a LIFO manner against the accumulated screen image and cursor conditions looking for the correct combination of the two to occur.

Eventually the analysis P5 is triggered with the complete pattern (blank under cursor at X,Y and the string CONNECT at origin X,Y−1).

Analysis P5 defers signalling the match until the pattern match settle timer P7 expires. Any additional communication from the host restarts the timer and potentially results in an alternative pattern match. When the settle timer expires, the signal S4 causes analysis P5 to signal the identifier of the matching pattern as S5 to the message handling process P9. If the pattern match timer (P7) expires, analysis P5 signals a TIME-OUT via signal S5.

Message handling P9 again queues the message until the next application time slice at which accumulated message(s) are presented to the AIM.

| 4) If it is desired for example to verify the speed of the link, the AIM may then examine the informational part of the CONNECT message: ATDT 123-4567 CONNECT 1200 [ ] |
|---|

This is achieved by selecting a cursor relative mask by way of control C5 to extraction P8 to extract the desired information from the accumulation buffer. The mask for this example would be:

| | |
|---|---|
| ------ **** [ ] | Cursor Relative mask from cX+7,cY−1 to cX10,cY−1 where cX,cY is the cursor coordinates. |

This will extract the string 1200, or any other information at that location, and return it by way of D6 to message handling P9 and D7 to AIM P1.

EXAMPLE OF THE OPERATION OF THE PRESENT INVENTION WHEN USED WITH A MACINTOSH ™ COMPUTER AND HYPERCARD ™

The following is a description of the operation of the present invention employed with a Macintosh Computer from Apple Computer Inc. Hypercard and Macintosh are trademarks of Apple Computer, Inc. However, the invention is equally applicable to operation with computers from other companies such as International Business Machines Corporation, or Digital Equipment Corporation, for example. Additional details of the structure and operation of Hypercard are contained in the publication "The Complete Hypercard Book", expanded 2nd Edition, Goodman, 1988, Bantam Books. That publication is incorporated herein by reference.

When an AIM is run on a Macintosh Computer utilizing Hypercard, both HyperCard and the present invention are run at the same time. When HyperCard encounters a present invention command in an AIM, it looks in the Home card for the information necessary to run the command. Once an AIM is running, it calls the run-time module to execute commands. The AIM script invokes the present invention as necessary by using one of a set of XCMDs (external commands) or XFCNs (external functions) installed in the stack. These commands are labeled with the letters XCMD and XFCN in Hyper-Card's resource fork. The XCMDs pass parameters to and from the host system through the present invention. They convert serial messages from the host system into events to be handled by HyperCard using event handlers in scripts.

An AIM's first activity is to establish a connection between the user computer and the host system and allow the user to log on. Next, the stack provides a custom interface of choices related to the application called. The usual Macintosh conventions are followed to display selections based on the host application's offerings (for example, display incoming mail and make requests for a data search). The AIM generates and passes the necessary commands to the host application. These commands and the low-level responses from the host system are unseen by the user.

At the host system end, the host application sees a standard call from one of its regularly supported terminals. The fact that the call is from a HyperCard interface or a Macintosh is transparent to the host system. That is why, from the host's point of view, an AIM is a non-invasive interface.

The present invention communicates with the AIM in the same way it would communicate with any other HyperCard facility. Just as events at the keyboard can signal HyperCard events, so events in the communications link can signal the present invention events. A WHOOP is defined to watch for these events as patterns coming from the host system.

When a pattern coming from the host system matches a pattern defined in the WHOOP, the present invention sends a message to the AIM. The message is intercepted by a handler in the AIM, which describes what Hyper-Card should do when the event occurs. A handler for the present invention event is written in exactly the same way as any other HyperCard message. Much of an AIM consists of the definitions of handlers that respond to events signaled by the present invention, as well as from the events the user signals with the mouse or keyboard.

Following is the sequence of events in an interaction between an AIM and the host system.

1. The AIM invokes the present invention. The AIM's script opens the present invention automatically when the AIM is opened, keeps it on idle (ready to communicate when necessary), and closes it automatically when the AIM is closed. The script includes three handlers:

```
on open Stack
    openFitos (Friendly Interface To On-line
        Systems)
end openStack
on idle
    Fitos
end openStack
on closeStack
    closeFitos
end closeStack
```

2. The AIM creates a device. The present invention sets up a device for each session with the host system, the device being a virtual terminal.

3. The handlers are defined in the AIM. The handlers control displays that appear on the screen. They respond to messages the WHOOP sends out when it sees a designated pattern arriving on the session window. The handler is defined the same way as a standard HyperCard event handler.

4. The AIM tells the WHOOP what to look for. The present invention commands in the AIM pass predicted patterns to the WHOOP so the WHOOP can watch for these patterns.

5. The WHOOP signals patterns in host system activity. The WHOOP for each device continually monitors the session window as data arrives from the host system, searching for specific patterns. When it finds a sought pattern, it signals an event by sending a message to the handler.

6. The handlers transfer data between the AIM and the host system. The handlers transfer data detected by the WHOOP on the session window to a field of a card in the AIM. They also respond to signals generated by clicking the mouse, or to instructions entered from the keyboard, passing data or commands back to the host system.

The device created by the AIM is a logical device (as opposed to a physical device) and includes terminal emulation and a session window. A session window is an image of the conventional host terminal screen that is maintained to monitor host system patterns and activity. Unless the user asks to see the session window, it is invisible to the user.

There are specific protocols to interpret the data stream arriving from the host system and the data stream originating from the keyboard or the AIM, based on terminal type (VT100, TTY, T6530, etc.). The emulation process converts the data to characters in the session window image, using the correct protocol for the terminal. For each device, the script specifies:

The style of terminal presentation (for example, 6530 or TTY)

The communications protocol (for example, ASYNC on port A)

Details such as baud rate, bits per character, and stop bits, as necessary

There is a separate device for each concurrent session with the host system. When an AIM connects to one computer and logs on as one user for one session, the present invention needs only one device. However, if more than one port is used at a time, or the communications link is able to accept multiple sessions through the same port, the present invention creates a separate device for each session.

Figure 15:
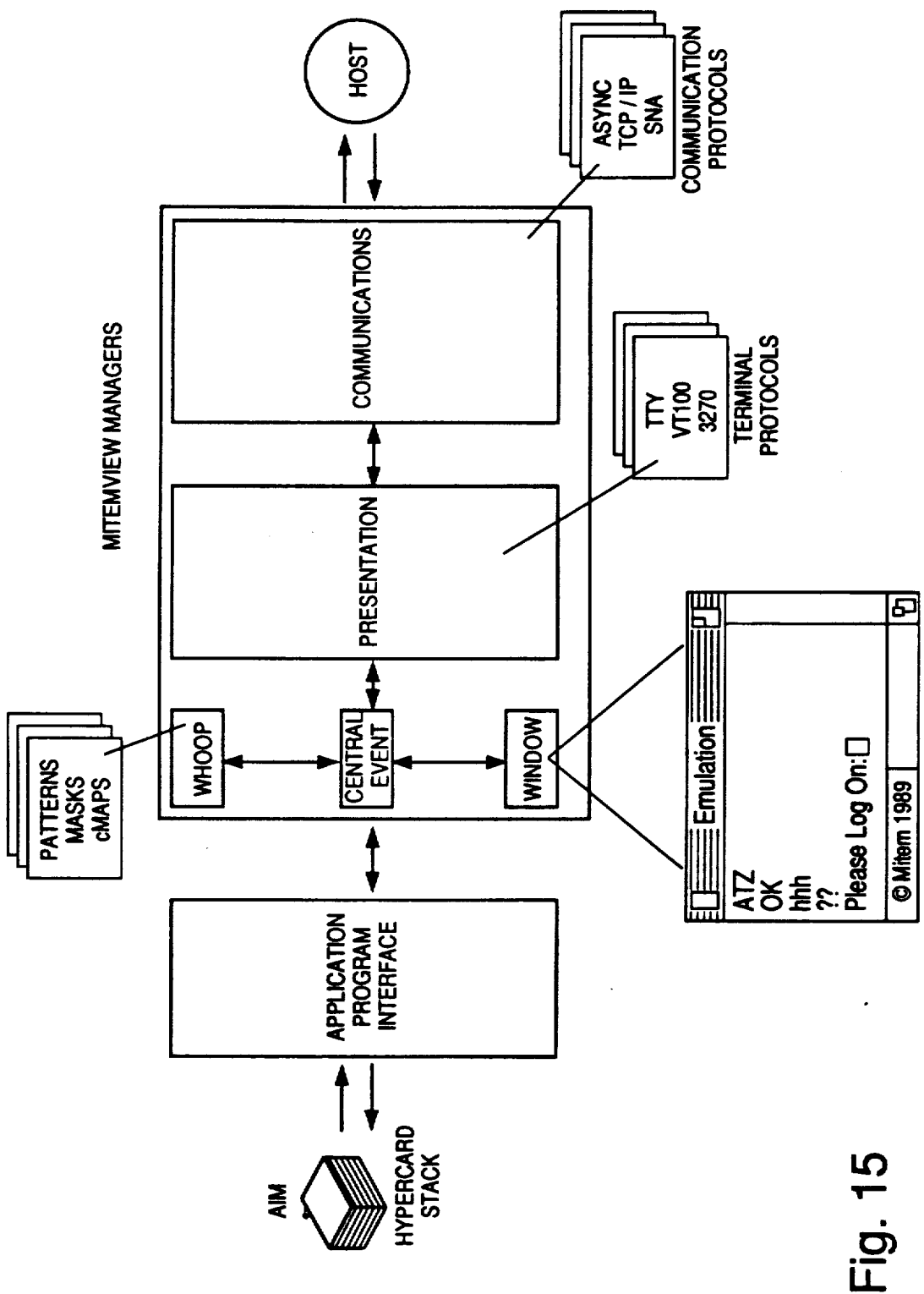
FIG. 15 illustrates the operation of the invention in connection with the control of a modem.

As discussed above, the present invention controls the devices through six managers: the Application Program Interface (API), the WHOOP, the Central Event Manager, the Window Manager, the Presentation Manager, and the Communications Manager. The interrelationship between these six managers is shown in FIG. 15. The present invention managers perform the following tasks:

Application Program Interface (API). Forms the link between the AIM, HyperCard, the custom XCMDs and XFCNs, and the present invention development tools and editors.

WHOOP. Performs real-time scanning of patterns on the session window as translated by the Presentation Manager. Detects predefined events to which the AIM must respond, and signals the Central Event Manager.

Central Event Manager. Routes and dispatches the present invention internal messages and events to the various managers.

Window Manager. Hides, displays, scrolls, and relocates the session window.

Presentation Manager. Transmits data received from the host system or from the keyboard to the session window according to the conventions of the requested terminal emulation.

Communications Manager. Accepts data arriving from the host system through one of the user system communication ports and passes it on to the Presentation Manager. In addition, the Communications Manager takes outgoing data and presents it to one of the user system communication ports for transmission to the host system.

These six managers act together to move data between host applications and the AIM. For example, referring to FIG. 15, assume that the AIM sends a command to the WHOOP to "watch for" the appearance of the letter "A" and a command to the Window Manager to display the session window. The WHOOP starts to watch for the appearance of the letter "A." The session window appears in a Macintosh window but the session window does not need to be visible for all of these actions to take place.

Now assume that the host system sends a letter "A" to the user's terminal. The present invention Communications Manager receives the letter and sends it on to the Presentation Manager. The Presentation Manager uses the current terminal emulation parameters (either 6530 or TTY) to interpret the incoming letter and causes an "A" to appear in the appropriate format on the session window.

When the letter appears on the session window, the WHOOP detects its presence and sends a message to the AIM that an "A" has arrived. The AIM then initiates a task based on the fact that the host system has sent a letter "A."

There is another key component in the present invention. This is the recorder and player. The recorder and player records a session with the host systems and then plays it back. This is particularly useful when building an AIM by way of a modem. A sender can capture the conversation between the host system and the Macintosh while they are connected, and then analyze and manipulate it after disconnecting, thereby reducing line charges.

The recorder and player can be used in two ways:
In the early stages of development, to capture host transactions in slow motion.
In later stages, to verify that the AIM and the host system interact as anticipated.

Figure 16:
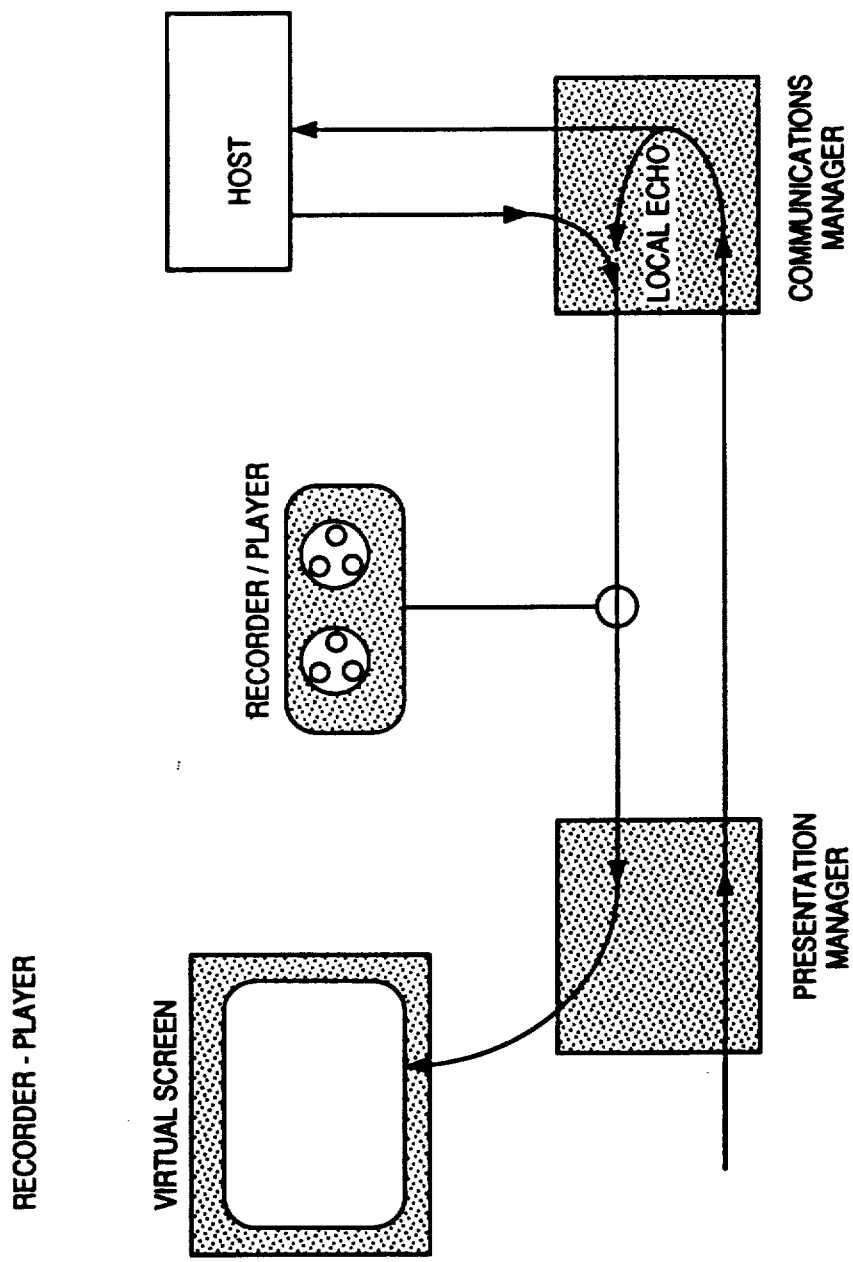
FIG. 16 is a diagram showing the functions of the recorder/player in the present invention.

FIG. 16 shows how the recorder and player are positioned between the device's Communications Manager and the Presentation Manager of the session window. It is designed to record both sides of the conversation between the session window and the host system. The recorder and player does not distinguish between messages that come from the host system directly and messages transmitted from the Communications Manager through a local echo.

As with other HyperCard commands, if a command is typed in the Message window and there is a handler for the command in the script, the command executes at once—a useful feature for debugging or development.

In the discussions that follow, the present invention commands are organized into groups that relate to specific issues. Any of the commands can be used on its own, irrespective of the grouping below.

| Group 1 | |
|---|---|
| The Present Invention Availability | |
| openFitos | Makes the present invention available. |
| closeFitos | Removes the present invention and cleans up when the AIM is closed. |
| fitos | Allows the present invention to pass messages to the AIM. |
| fitosVers | Returns the current present invention version number. |
| stackVers | Returns the version number of the current stack. |
| maxMemory | Returns amount of free memory. |
| Group 2 | |
| Device Control | |
| makeDevice | Creates a device, including its session window and its WHOOP. Before the device can communicate, the AIM must make a device for each active session. |
| commandTo | Sends a command to one of the managers associated with a device (for example, to initialize the WHOOP). |
| stateTo | Revise the state parameters of one of the managers associated with a device (for example, makes a device's window visible or invisible or alters the communications parameters). |
| pfKey | Sends a sequence of characters associated with a particular virtual device's Function Keys. |
| Group 3 | |
| Pattern Matching | |
| addPattern | Adds a previously defined pattern to the list for a WHOOP. addPattern also specifies the name of the handler to which the |

-continued

| | |
|---|---|
| | WHOOP must signal when the pattern is found. |
| rmvPattern | Removes a pattern from a particular WHOOP's list. |
| modifyPattern | Modifies the attributes of a pattern already in the WHOOP. In this way, the AIM may alter its response to patterns as circumstances change. |
| addErrPattern | Adds an error pattern to a device's WHOOP. |
| modifyErrPattern | Change the state of an error pattern that has already been added to the WHOOP. |
| rmvErrPattern | Removes the most recently added error pattern from the WHOOP. |
| timeOut | Tells the WHOOP how long to wait for a response from the host system before signaling an error to the AIM. |
| whenWHOOP | Instructs the WHOOP to modify its rules about when to check patterns. |

Group 4
Reading To And Writing From The Session Window

| | |
|---|---|
| typeString | Writes a string of characters to a device's session window and transmits them to the host system. |
| slitAttribute | Returns a string of attributes bytes for a slit. |
| slitString | Returns a text string taken from the device's session window by looking through a specific slit in a mask. |
| allSlits | Returns the number of slits that a mask contains, or indicates which slits contain specified text. |
| collectOn | Opens a buffer to receive a filtered stream of characters arriving from the host system. (The collected characters are retrieved by the function dataFrom.) |
| collectOff | Terminates collectOn. |
| dataFrom | Returns the characters collected in the device's buffer. This is a step in processing a block of data transmitted from the host system. |
| dataTo | Transfer data from a HyperCard contained to the session window and to the host system. |
| dataOff | Terminates dataTo. |
| fromMask | Transfers data from specific locations on a device's session window (specified by a mask) to one or more HyperCard containers. |
| toMask | Transfers data from one or more HyperCard contains to locations on a device's session window. |

Group 5
File Transfer

| | |
|---|---|
| fileFrom | Starts a file transfer from the host system to the Macintosh. Once started, sends progress reports as the transfer proceeds so the AIM can inform the user. |
| fileTo | Starts a file transfer to the host system from the Macintosh. Once started, sends progress reports as the transfer proceeds so the AIM can inform the user. |
| fileOff | Aborts a file transfer that has not yet completed. |
| getFile | Opens a dialog that returns both the name of a file and the path to it. |

Group 6
Recorder And Playback Commands

| | |
|---|---|
| recorderOn | Captures the data stream arriving from the host system and records it in a file. |
| recorderOff | Terminates a recording and closes the file in which the data stream was being recorded. |
| playerOn | Takes the data recorded in a file and presents it to the Communications Manager as if it were being received in a session with the host system. |
| playerOff | Turns off the player. |

Block Mode

Full-screen applications usually operate the terminal in what is called block mode. That is, the host application sends the terminal a transmission that paints the entire screen. Subsequent transmissions may update portions of the screen, but the screen remains present as a whole until the host clears it and transmits an entirely new screen. This mode of operation is quite different from the continuous scrolling mode, which imitates the irreversible forward movement of an endless piece of paper.

As the user writes on the screen, the terminal records the changes but delays sending them to the host system until the user presses a particular key (for example, the one designated Send). Then the terminal transmits as a block information about all the changes the user has made since the previous Send.

Frequently, in setting up the screen, the host system also defines the field in which the user can write. The field definitions act as a mask: the user can write only within them. The application may also define automatic tabs, so that upon filling one field, the cursor moves directly to the next in the sequence that the host application mandates.

Depending on how "smart" the terminal is, the terminal may also validate what the user writes in the fields. For example, when the host system sets aside eight positions for a field and calls them numeric, the terminal will not accept a non-numbered character, nor an input of more than eight digits in this field. Indeed, the terminal will not send anything at all to the host system until the entries are within the constraints the host system has specified.

AIM DEVELOPMENT

Developing an AIM: The task is to construct a HyperCard Stack that gives the user a friendly Macintosh interface and a set of controls of the host Application. The AIM must detect patterns in what the host transmits to the present invention virtual screen, and the AIM must contain HyperTalk handlers for events that are detected by the present invention WHOOP and that may be caused by the user (mouse and keyboard actions).

Preparatory work in developing an AIM: Design the user interface and analyze the host's transmissions, states, and characteristic patterns.

Specific work in developing an AIM: Design the AIM's HyperCard stacks, use the present invention editors to create data patterns, masks, and maps for moving data to and from the host Application. Write the HyperTalk handlers to be used within the AIM.

To minimally activate an AIM, the user must send the present invention the following commands:

openFitos: Starts up the present invention and establishes the link between the AIM and the services provided by the present invention.

makeDevice: Creates a virtual device and a WHOOP for that device. Also names the window that displays the virtual screen. Specifies the communication settings and protocols being used.

In addition to these two commands, the user must also create handlers for two other present invention commands and handlers for two present invention messages that get sent back to the AIM. The two present invention commands that require handlers are:

fitos: Directs the present invention to deliver any events or data that it is holding to the AIM. This command is most often placed in an idle handler at the stack level.

closeFitos: Terminates the present invention services. Virtual devices and open files are closed and memory is deallocated.

The two present invention messages that require handlers are:

windowMessage: A message that the present invention sends to the AIM when changes occur to the window containing the virtual screen. The parameters that accompany the message provide detailed status information about the window.

commError: A message that the present invention sends to the AIM when communication errors occur. The parameters that accompany the message indicate the kind of error that was encountered.

In the AIM to be developed, the scripts and handlers will be distributed between two cards. As an example of the use of the invention in a communication environment, the first card, the top card of the stack, can be considered the user's navigation card. During AIM development this card can also be used as the place from which to activate the present invention, examine the window of host transmissions to the virtual screen, locate and identify host patterns, and use and examine the WHOOP, among other things.

The second card, called the Set Up card, emulates one form of a communication's setup option that might be provided in an actual AIM. In complex applications, this card might be better implemented as an entire and separate stack.

To start, another card is created in the AIM stack (either activate the NEW CARD menu command or do a COPY CARD followed by a PASTE CARD).

With two cards in the stack, return to the first card, add a legend and four potential button locations.

Layout the Set Up card by adding legends and potential field and button locations. The Set Up card provides users access to needed communication settings. These are settings that might require adjustment based on the type of terminal being used, the phone hookup, the modem speed, and other communication parameters associated with the particular AIM and host situations. In building an AIM, it is good practice to provide users with an easy way to change variable communication settings by using a card or stack like Set Up.

Now, add two buttons and a card field to the navigation card, as follows:

Card Button 1: LogOn (Shadow, Auto Hilite) [name(style, hilite setting)]

Card Button 2: Set Up (Shadow, Auto Hilite)

Card Field 1: Status (Shadow) [name(style)]

LogOn will be used to activate and deactivate handlers that cause the present invention to run and terminate, respectively.

Set Up will be used to send the user to the Set Up card in order to change some of the communication settings.

The Status field will display the current set of communication settings being transmitted to the present invention for emulation purposes and other status messages during AIM operations.

Add the following buttons and card fields to the Set Up card:

Card Button 1: OK (Shadow, Auto Hilite)
Card Button 2: Cancel (Shadow, Auto Hilite)
Card Field 1: User Number (Rectangle, visible)
Card Field 2: Phone (Rectangle, visible)
Card Field 3: Speed (Rectangle, visible)
Card Field 4: Dial (Rectangle, visible)
Card Field 5: Old User Number (Rectangle, hidden)
Card Field 6: Old Phone (Rectangle, hidden)
Card Field 7: Old Speed (Rectangle, hidden)
Card Field 8: Old Dial (Rectangle, hidden)

OK will be used to check and record the current communication settings and return the user to the navigation card.

Cancel will restore the communication settings to the values saved in the Old card fields, and return the user to the navigation card.

The 300, 1200, and 2400 Baud buttons cause the speed setting to be changed. The speed value will be put into the Speed card field.

The Pulse and Tone Dial buttons will set the type of dialing option the user wishes to use. The setting will be stored in the Dial card field.

The user may enter a user identification number into card field User Number, and a phone number into the Phonefield. The baud rate is set by entering either 300, 1200, or 2400 into the card field Speed. Dialing options can be set by typing "T" (for Tone dialing) or "P" (for Pulse dialing) into card field Dial. Current settings will be transferred to the navigation card by the script that activates the present invention.

All of the hidden fields will be used to store either current or past communication settings. The user does not need to see those fields when the AIM is operating. To begin, type the number 1200 into card field Speed and the letter "T" into card field Dial. Entering these values will set the start up communication settings to 1200 baud and tone dialing. If the modem operates at only 300 or 2400 baud, put either 300 or 2400 into the field Speed. If the phone system uses pulse dialing, put the letter "P" into the field Dial.

If speed and dialing settings are not entered, or are entered incorrectly, a warning message will be displayed when the OK button is clicked to record the settings.

Listed below is an example HyperTalk, stack level handler for activating an AIM called startSession. The handler gets the communication settings, invokes the openFitos command, sends a makeDevice command, and then transmits a stateTo command to the Window Manager telling it to display the virtual screen in a window.

Mask and Patterns

When a user marked the modem OK pattern, they also marked a mask to be associated with the pattern. A pattern specifies the set of characters the WHOOP will be told to look for. A pattern cannot exist on its own: it requires a mask to give it shape. A mask specifies where to look and the shape of the pattern. The set of positions in a mask are similar to a set of holes in an opaque card that isolate places of interest.

Each row of a mask is called a slit, and, unlike a pattern, a mask can exist on its own. Masks, especially the ones used with cMaps, that are completely pattern independent, can be created and saved. A slit is the consecutive positions in a mask's row, and the simplest mask consists of just one slit. During pattern matching, the WHOOP uses an entire mask to look for data. The present invention data transfer commands, however, may refer to individual slits within a mask.

With the selected modem OK pattern highlighted Edit Patterns is selected from the MPedit menu. The MPedit window appears.

The present invention Mask and Pattern Editor performs the following functions:

Saves resources (patterns, masks, transactions, and cMaps) created by using MPedit and the session window. When resources are saved, the resources can be defined and attributes assigned.

Edits previously stored resources. Permits changing resource attributes and deleting the present invention resources from the stack's resource fork.

Copy resources. The present invention resources can be copied from one AIM to another.

Create and Edit cMaps that can be used to transfer data between HyperCard containers and the slits in a mask. cMaps are particularly useful for specifying the transfers of full-screen data blocks to and from the host.

The Mask and Pattern Editor stores each pattern, mask, transaction mask, and map as a resource in the AIM. To refer to one of these resources in an AIM script, its name can be used in one of the relevant present invention commands.

1. Select the Patterns radio button. If it is not selected, click on the Patterns radio button to indicate the intent to work with a pattern.

2. Name the pattern. Type "ModemOK" into the field labeled Pattern Name. When an existing resource is edited, its name can be selected from the scroll window at the top left and the Load button clicked. "Editing" means changing the attributes of a resource and doesn't include changing the shape of a mask. To change the mask, the old resource must be deleted and replaced with a new one.

3. Indicate attribute choices. For the ModemOk pattern, click Cursor Relative, Fixed Column, Enable Pattern, and One Shot Pattern. The choice of pattern attributes will be discussed below.

4. Save the pattern. Click the New Pattern button. The pattern name will appear in the scroll window.

For the ModemOK pattern, the pattern was indicated as Cursor Relative. Choosing this attribute tells the WHOOP that the pattern's mask has no fixed position on the screen. Instead, its position is defined with respect to the position of the cursor. When the WHOOP tries to match a cursor-relative pattern, it slides the entire mask so that the elements of the mask have the same offset from the current cursor as they had at the time the pattern was marked. The cursor may be inside the mask (as with ModemOK), but does not need to be. The WHOOP always knows the position of the cursor whether or not the cursor is visible through the mask.

If Cursor Independent was chosen, this would be telling the WHOOP that the pattern's mask is located at a fixed screen position, regardless of where the cursor may be. The WHOOP would look through the mask for the pattern at the place where the original pattern was marked. Cursor-independent patterns are usually appropriate only for block mode host transmissions (whole screen transmissions) or for a pattern that the host sends to a specific screen address.

Fixed Columns and Fixed Row

These options restrict the interpretation of a cursor relative resource. The Options are not available for a cursor-independent resource.

Fixed Column

Fixed Column tells the WHOOP to consider the pattern only when it occurs in the same columns it occupied when the pattern was captured. In other words, the pattern's mask is free to slide up and down, but not sideways. As an example of its use, a modem is unlikely to put the "OK" response anywhere but at the beginning of a line. Fixed column patterns are common in host transmissions that use asynchronous communications, like TTY emulation.

Fixed Row

Fixed Row tells the WHOOP to consider a pattern only when it occurs in the same rows it occupied when the pattern was captured. The mask would be free to slide sideways to follow the cursor, but could not slide up and down. For example, there is no guarantee that the modem will always put the "OK" message on the second screen row. The first initialization attempt might fail and the modem would respond with "ERROR" on the second row. A subsequent retry at initialization might succeed and the "OK" message would appear on another row. A pattern is likely to occur at a fixed row only when the host specifically addresses it to a row or when the pattern is part of a full-screen (block mode) transmission. During TTY emulations such transmissions are not possible.

Fixed Column and Fixed Row

With both Fixed Row and Fixed Column, the WHOOP looks for the pattern only when it occurs in the same position (row and column) as it had when the pattern was captured.

Neither Fixed Column nor Fixed Row

With this option, the WHOOP attempts to find a match for the pattern anywhere on the screen. The WHOOP has no problem making this kind of exhaustive search. However, a user may want to restrict the search to a fixed row or column to make sure that the patterns are reliable.

Enable Pattern

Checking the Enable Pattern box means that the pattern will be immediately enabled when it is added to the WHOOP. If this box is not checked, when the pattern is added to the WHOOP (with the addPattern command), it will remain inactive until expressly enabled with the present invention modifyPattern command.

Synchronous Pattern

When the Synch.Pattern box is checked, the pattern (when added to the WHOOP and enabled) causes the WHOOP to act in a synchronous fashion. That is, when the WHOOP matches the pattern, it signals the pattern's handler in the usual way and instructs the Presentation Manager to suspend posting characters to the session window.

Since the event is signaled to the AIM immediately and no additional characters reach the screen, the screen and the event are synchronized. An AIM command that looks at the screen is assured of seeing the screen as if the pattern had just arrived.

During the suspension, the present invention buffers arriving characters and they are not lost. When HyperCard finishes executing the handler signaled by the pattern match, the suspension terminates. If the handler cannot complete for any reason, the suspension still terminates.

One Shot Pattern

When a pattern has the attribute One-Shot, it has only one change to "fire." As soon as the WHOOP matches the pattern, the WHOOP changes the pattern's status from enable to disable. Even though the pattern might still be in the WHOOP, it will not be matched again until its status is set back to enable.

For the example given above, for the Hayes modem, the ModemOk pattern should have its one-shot attribute set. Once the AIM knows the modem is working, the user does not want the WHOOP to keep finding the modem's "OK" message on the screen and sending a signal back to the AIM's ModemOk handler. The ModemOK pattern should be removed at that point and whatever patterns are needed are added for the next stage of AIM processing.

Gamma Pattern

A Gamma Pattern is one that cannot be matched at the same place twice in a row. A gamma pattern is usually (but not necessarily) cursor-relative. Once a gamma pattern has been matched with the cursor at a particular location, the WHOOP will not again report a match with the cursor at that location until the pattern is matched with the cursor at a different location.

A gamma pattern is useful in identifying successive lines of multi-line text. For such lines, almost the only distinguishing clue is that the cursor has returned to column 0. Making the pattern a gamma pattern prevents the WHOOP from signaling more than one match for the same pattern on the same line.

Settle Time

Settle time adds duration to the description of a pattern. A pattern's settle time is the length of time the host must remain quiet (no transmissions) before the WHOOP reports a match. Including settle time as part of a pattern's definition has two useful effects:

1. Avoids having the AIM send a response to the host before the host is ready.
2. Avoids false positives that might arise from transitory matches.

After sending a prompt, some hosts may not be immediately ready to accept a reply. Using a settle time prevents the WHOOP from matching the pattern and the AIM sending a reply before a host is ready to receive information. A second feature of using settle time is that it avoids "false positives"—legitimate host transmissions, which taken out of context, look like patterns the WHOOP has been asked to detect.

Once the ModemOK pattern has been marked and saved, that pattern may be used in the AIM. To do so, the startSession handler's script is updated two new handlers are added at the stack level as well.

One key debugging and development tool of the present invention is the WHOOP Inspect feature. With the AIM running, click on WHOOP Inspect in the MPedit menu. The WHOOP Inspect window will appear. This window tells what patterns are currently in the WHOOP and whether the WHOOP is enabled. This window is extremely useful during development and while debugging an AIM. The window can stay on the screen, along with the session window, and all the HyperCard tools and windows.

The six state codes to the right of the handler name give information about each pattern in the WHOOP. The six state codes have the following interpretations:

1. P—for Pattern.
2. D or E—for Disabled or Enabled.
3. A or S—for Asynchronous or Synchronous.
4. M or 1—for Multi-shot or One-shot.
5. G or (space)—for Gamma or not gamma.
6. T: and Value—for settle time value.

Patterns can be added to the WHOOP manually by entering an addPattern command through the HyperCard message window: addPattern "device", "whoop", "ModemOK". Another way to do the same thing is to put two "generic" buttons on the AIM navigation card, Add Pattern and Rmu Pattern.

The following are scripts for buttons for various cards of the AIM.

```
on mouseUp
    —Install a pattern in the WHOOP
    —Get the pattern name
ask "Name of pattern . . . "
    —Put name into container
put it into patName
    —Add the pattern to the WHOOP
addPattern "device", atName," ",patName end
    mouseUp
on mouseUp
    —Remove a pattern from the WHOOP
    —Get the pattern name
ask "Name of pattern . . . "
    —Put name into container
put it into patName
    —Remove the pattern
rmvPattern "Device", patName
end mouseUp
```

When the buttons have been created and the button scripts inserted, the Add Pattern button is clicked on (with the WHOOP Inspect window showing). A dialog box will appear, at which time the name of the pattern is entered, ModemOk, and Return pressed.

In addition to the regular WHOOP, the present invention also maintains another pattern matching facility called the ErrorWHOOP. The present invention activates the Error WHOOP whenever a timeOut command is in effect for a virtual device and the WHOOP receives no data from the host during the timeout period.

The Error WHOOP has its own separate set of commands for adding, modifying, and removing error patterns. The Error WHOOP commands are:

addErrPattern—add an error pattern
modifyErrPattern—modify an error pattern
rmvErrPattern—remove an error pattern Unlike regular patterns, error patterns do not show up in WHOOP Inspect.

To delete a pattern, mask, transaction, or cMap, open the MPedit window by choosing Edit Patterns . . . on the MPedit menu.

1. Click, the radio button for the type of resource to be deleted (Patterns, Transactions, Mask Only, or cMaps).
2. In the scroll window, select the name time or items to be deleted. To select several consecutive items, press Shift while clicking. To select items that are not contiguous, press Command-Option on all clicks after the first.
3. Click Delete to remove the selected resources.

Each resource in an AIM (pattern, transaction, mask or cMap) can be copied between the current open stack and another stack by clicking the Copy button on the MPedit window. Clicking the Copy button brings up a standard dialog box with a scrollable window containing the names of folders and HyperCard stacks.

When the second stack is selected, the present invention Resource Copier window will appear. The Resource Copier window has two side-by-side scrollable lists, one for each stack. When one of the radio buttons is clicked (Patterns, Transactions, Mask Only, cMaps), listing of the selected resources for both stacks appear in the scrollable list areas. The developer can then proceed to select items and move or copy the resources between the two stacks.

Two commands of the present invention transfer data between HyperCard containers and the slits of a mask on the session window. The command fromMask moves data from the screen to one or more containers. Characters are taken from particular slits and moved to containers. The destination (or destinations) may be any HyperCard containers, including card fields, background fields, or global HyperCard variables.

The command toMask does the reverse. During execution of toMask, for terminal emulations which support data types such as protected fields, the present invention verifies that the data type supplied to the mask is consistent with the host's description of that field and signals an error if there is a type mismatch.

Navigation between containers and the slits of a mask is governed by an object called a cMAP (for container map). A cMAP is stored in the AIM's resource area. When either fromMask or toMask is used, the command must include the name of an existing cMAP. Thus, before using either of these commands, the developer must have set up one or more cMaps.

Each cMaps consists of a list of containers and for each container a set of frames that relate containers to the various slits in the mask. Taken together, the set of frames for a particular container constitute a recipe for the container contents. The sequence of a set of frames specifies the order in which data from the various slits are moved into a container (for fromMask operations) or out of a container to the slits (for toMask Operations).

A cMap can also specify constant text to be inserted along with the data received from the mask. Constants are ignored in sending data from containers to the mask.

The mask used must have slits that cover all the data to be transferred. Data from different slits can be put into different containers, or data can be concatenated from several slits into one container. It is permissible to use the same slit more than once, or to make no use of some slits. The whole slit must be taken; the developer cannot address individual characters within a slit.

1. Open the Editor. With the session window visible, pull down the MPedit menu and select Edit Patterns . .

2. Specify a mask for the new cMap. The developer has a choice of either of two ways to specify the mask on the session window:

2a. Draw the mask on the session window. This procedure is similar to the way the ModemOk pattern and mask were created earlier.

or

2b. Load an existing mask. To load an existing mask: Click the Mask Only radio button on the MPedit window. The names of masks defined appear in the scrollable list. Click the Load Mask button. The selected mask will be brought to the session window.

We claim:

1. A method of simultaneously executing one or more computer application programs in one or more host computer systems under the control of a second computer system, where said computer application programs may be dissimilar to each other, and said host computer systems may be dissimilar to each other, said second computer system including a human user interface and performing operations on data and instructions, said host computer systems generating presentation information based on said application programs, said method comprising the steps of:

establishing a plurality of relevant selected parameters in said host computer presentation information;

said relevant selected parameters having a variable time of occurrence and context in said presentation information;

providing said relevant selected portions of said host computer system's presentation information as input to a computer program resident in said second computer system;

examining and interpreting selected portions of said host computer system presentation information, in said application programs being executed at said second computer system to detect the presence therein of one or more of said selected parameters;

said examination of said host computer system presentation information being dependent on the time of occurrence and the context of said selected parameters in said host computer presentation information;

continuing said operation of said second computer system during said examining for said selected parameters; and generating an indication to said second computer system of the detection of one or more of said relevant selected parameters in said host computer system presentation information.

2. A method of simultaneously executing one or more computer application programs in one or more host computer systems under the control of a second computer system, where said computer application programs may be dissimilar to each other, and said host computer systems may be dissimilar to each other, said second computer system including a human user interface and performing operations on data and instructions, said host computer systems generating presentation information based on said application programs, said method comprising the steps of:

establishing a plurality of relevant selected parameters in said host computer presentation information;

said relevant selected parameters having a variable time of occurrence and context in said presentation information;

interpreting selected portions of said host computer system's presentation information, in said application programs being executed;

providing said interpreted selected portions of said host computer system's presentation information as input to a computer program resident in said second computer system;

examining said host computer presentation information at said second computer system to detect the presence therein of one or more said selected parameters;

said examination of said host computer system presentation information being dependent on the time of occurrence and the context of said selected parameters in said host computer presentation information; and generating an indication to said second computer system of the detection of one or more of said relevant selected parameters in said host computer system presentation information.

3. A method in accordance with claim 2 including the step of:
generating a user's interactions at said user interface to at least some of said interpreted selected portions of said host computer system's presentation information.

4. A method in accordance with claim 2 in which said examining for a given selected parameter continues for only a predetermined length of time.

5. A method in accordance with claim 4 including the step of generating at said user interface an indication of the lack of the detection of a selected parameter during said predetermined length of time.

6. A method in accordance with claim 2 in which any one of said selected parameters can be detected only once in said presentation information.

7. A method in accordance with claim 3 including the step of:
providing said user's interactions at said user interface as input to said resident computer program in said second computer system.

8. A method in accordance with claim 7 including the step of:
generating information from said resident computer program in response to said user's interactions.

9. A method in accordance with claim 8 including the step of:
transmitting said generated information to said host computer system.

10. A method in accordance with claim 8 in which at least one of said selected parameters is based on the position of said parameter in said presentation information.

11. A method in accordance with claim 9 in which said presentation information is arranged in rows and columns.

12. A method in accordance with claim 11 in which said selected parameter is located in a given one of said rows.

13. A method in accordance with claim 11 in which said selected parameter may be located in any of said rows and any of said columns.

14. A method in accordance with claim 11 in which said selected parameter is located in a given one of said columns.

15. A method in accordance with claim 12 in which said selected parameter can be detected only once in any given one of said rows.

16. A method in accordance with claim 11 in which said selected parameter is located in a given one of said rows and a given one of said columns.

* * * * *